US008871385B2

(12) United States Patent
Gering et al.

(10) Patent No.: US 8,871,385 B2
(45) Date of Patent: Oct. 28, 2014

(54) ELECTRODES INCLUDING A POLYPHOSPHAZENE CYCLOMATRIX, METHODS OF FORMING THE ELECTRODES, AND RELATED ELECTROCHEMICAL CELLS

(75) Inventors: Kevin L. Gering, Idaho Falls, ID (US); Frederick F. Stewart, Idaho Falls, ID (US); Aaron D. Wilson, Idaho Falls, ID (US); Mark L. Stone, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 126 days.

(21) Appl. No.: 13/359,716

(22) Filed: Jan. 27, 2012

(65) Prior Publication Data

US 2013/0196223 A1 Aug. 1, 2013

(51) Int. Cl.
*H01M 4/00* (2006.01)

(52) U.S. Cl.
USPC ....... 429/209; 429/218.1; 429/245; 29/623.1; 29/623.2; 29/623.3; 29/623.4; 29/623.5

(58) Field of Classification Search
CPC ............ B05D 5/12; H01M 2/14; H01M 4/60; Y02E 60/12
USPC ............ 429/209, 218.1, 245; 29/623.1–623.5
See application file for complete search history.

(56) References Cited

U.S. PATENT DOCUMENTS

| | | | | |
|---|---|---|---|---|
| 4,223,080 | A * | 9/1980 | Auborn | 429/345 |
| 6,087,043 | A | 7/2000 | Tossici et al. | |
| 6,316,142 | B1 | 11/2001 | Delnick et al. | |
| 6,403,755 | B1 | 6/2002 | Stewart et al. | |
| 6,428,929 | B1 | 8/2002 | Koy et al. | |
| 2005/0106458 | A1* | 5/2005 | Eguchi et al. | 429/212 |
| 2009/0263707 | A1 | 10/2009 | Buckley et al. | |
| 2010/0291442 | A1* | 11/2010 | Wang et al. | 429/231.95 |
| 2011/0051322 | A1 | 3/2011 | Pushparaj et al. | |

(Continued)

FOREIGN PATENT DOCUMENTS

| | | |
|---|---|---|
| WO | 2011/008742 | 1/2011 |

OTHER PUBLICATIONS

Geng et al., Evaluation of polyketones with N-cyclic structure as electrode material for electrochemical energy storage: case of tetraketopiperazine unit, Energy Environ. Sci., 2010, 3, 1929-1933.

(Continued)

*Primary Examiner* — Mark F Huff
*Assistant Examiner* — Omar Kekia
(74) *Attorney, Agent, or Firm* — TraskBritt

(57) ABSTRACT

An electrode comprising a polyphosphazene cyclomatrix and particles within pores of the polyphosphazene cyclomatrix. The polyphosphazene cyclomatrix comprises a plurality of phosphazene compounds and a plurality of cross-linkages. Each phosphazene compound of the plurality of phosphazene compounds comprises a plurality of phosphorus-nitrogen units, and at least one pendant group bonded to each phosphorus atom of the plurality of phosphorus-nitrogen units. Each phosphorus-nitrogen unit is bonded to an adjacent phosphorus-nitrogen unit. Each cross-linkage of the plurality of cross-linkages bonds at least one pendant group of one phosphazene compound of the plurality of phosphazene compounds with the at least one pendant group of another phosphazene compound of the plurality of phosphazene compounds. A method of forming a negative electrode and an electrochemical cell are also described.

28 Claims, 13 Drawing Sheets

10 12 14 18 16 20

(56) References Cited

U.S. PATENT DOCUMENTS

| | | | |
|---|---|---|---|
| 2011/0111279 | A1 | 5/2011 | Smithyman et al. |
| 2011/0217585 | A1 | 9/2011 | Wang et al. |
| 2011/0226987 | A1 | 9/2011 | Yakovleva et al. |
| 2011/0256440 | A1 | 10/2011 | Nelson et al. |

OTHER PUBLICATIONS

Luther et al., "Synthesis and Characterization of Poly{hexakis[(methyl)(4-hydroxyphenoxy)]cyclotriphosphazene}," Journal of Applied Polymer Science, vol. 82, 3439-3446 (2001).

Renault et al., "Evaluation of polyketones with N-cyclic structure as electrode material for electrochemical energy storage: case of pyromellitic diimide dilithium salt," Chem. Commun., 2011, 47, 2414-2416.

Stewart et al., "Reactions and Polymerization of Hexa-[3-tert-butyl-4-hydroxyphenoxy]cyclotriphosphazene: A New Method for the Preparation of Soluble Cyclomatrix Phosphazene Polymers," Journal of Applied Polymer Science, vol. 80, 242-251 (2001).

Allcock et al., "Coupling of Cyclic and High-Polymeric [(Aminoaryl)oxy]phosphazenes to Carboxylic Acids: Prototypes for Bioactive Polymers", Macromolecules, 1982, 15(3), pp. 693-696.

Allcock et al., "Alkylation of Cyclic and High Polymeric Phosphazenes via Reactions between Aluminum Alkyls and Aminophosphazenes1,2", Organometallics, 1988, 7(3), pp. 612-619.

Luther et al.; "On the Mechanism of Ion Transport through Polyphosphazene Solid Polymer Electrolytes: NMR, IR, and Raman Spectroscopic Studies and Computational Analysis of 15N-Labeled Polyphosphazenes"; J. Phys. Chem. B, 2003, 107, pp. 3168-3176.

* cited by examiner

ELECTRODES INCLUDING A POLYPHOSPHAZENE CYCLOMATRIX, METHODS OF FORMING THE ELECTRODES, AND RELATED ELECTROCHEMICAL CELLS

STATEMENT REGARDING FEDERALLY SPONSORED RESEARCH OR DEVELOPMENT

This invention was made with government support under Contract Number DE-AC07-051D14517 awarded by the United States Department of Energy. The government has certain rights in the invention.

FIELD

The present disclosure, in various embodiments, relates generally to electrodes for electrochemical cells, methods of forming the electrodes, and related electrochemical cells. More specifically, the present disclosure, in various embodiments, relates to electrodes including a polyphosphazene cyclomatrix.

BACKGROUND

Lithium-ion batteries play a vital role in the development of many energy-dependent applications, such as electric vehicles, portable electronics, and renewable energy storage. However, with the wide adoption of lithium-ion batteries over the last two decades, technology limitations that impede more widespread implementation of lithium-ion batteries have become evident. Foremost concerns deal with insufficient energy storage, poor safety, high cost, and inadequate lifetime of lithium-ion batteries, with ancillary issues including poor low temperature performance and problematic recyclability. For example, carbon-based negative electrodes of many conventional lithium-ion batteries provide relatively modest lithium storage capacity depending on the form of carbon (hard vs. soft, graphitic vs. amorphous, etc.), represent a safety concern in situations of thermal runaway, and exhibit poor high energy density cycle life due to limited porosity (e.g., anode particles mechanically degrade because of insufficient expansion space). In addition, conventional lithium-ion batteries are expensive to manufacture due to high raw material costs and the expensive processing methods used to produce pure, dry materials. As a result of such deficiencies, many industries, such as the automotive industry, have been reluctant to adopt lithium-ion technology in applications under development (e.g., hybrid vehicle, plug-in hybrid vehicle, and electric vehicle platforms, where the cost per battery pack can run several thousand dollars).

It would, therefore, be desirable to provide an electrode having at least one of increased lithium capacity, improved electrical conductivity, greater stability, longer cycle life, and increased safety. In addition, it would be desirable if the electrode was cost-effective and easy to form on a current collector of an electrochemical cell.

SUMMARY

Embodiments described herein include negative electrodes, methods of forming negative electrodes, and electrochemical cells. For example, in accordance with one embodiment described herein, a negative electrode comprises a polyphosphazene cyclomatrix and particles within pores of the polyphosphazene cyclomatrix. The polyphosphazene cyclomatrix comprises a plurality of phosphazene compounds and a plurality of cross-linkages. Each phosphazene compound of the plurality of phosphazene compounds comprises a plurality of phosphorus-nitrogen units, and at least one pendant group bonded to each phosphorus atom of the plurality of phosphorus-nitrogen units. Each phosphorus-nitrogen unit is bonded to an adjacent phosphorus-nitrogen unit. Each cross-linkage of the plurality of cross-linkages bonds at least one pendant group of one phosphazene compound of the plurality of phosphazene compounds with the at least one pendant group of another phosphazene compound of the plurality of phosphazene compounds.

In additional embodiments, a method of forming a negative electrode comprises forming an electrode composition comprising a plurality of phosphazene compounds, particles, and at least one cross-linking agent. The electrode composition is deposited on at least one surface of a current collector.

In yet additional embodiments, an electrochemical cell comprises a negative electrode, a positive electrode, and a separator comprising at least one electrolyte between the negative electrode and the positive electrode. The negative electrode comprises a polyphosphazene cyclomatrix and particles within pores of the polyphosphazene cyclomatrix. The polyphosphazene cyclomatrix comprises a plurality of phosphazene compounds and a plurality of cross-linkages. Each phosphazene compound of the plurality of phosphazene compounds comprises a plurality of phosphorus-nitrogen units, and at least one pendant group bonded to each phosphorus atom of the plurality of phosphorus-nitrogen units. Each cross-linkage of the plurality of cross-linkages joins at least one phosphazene compound of the plurality of phosphazene compounds with at least one other phosphazene compound of the plurality of phosphazene compounds.

BRIEF DESCRIPTION OF THE SEVERAL VIEWS OF THE DRAWINGS

FIG. 2A is a photograph showing a top-down view of a negative electrode formed by thermal pressing, as described in Example 6;

FIG. 2B is a magnified photograph showing a top-down view of the negative electrode formed by thermal pressing, as described in Example 6;

DETAILED DESCRIPTION

Figure 1:
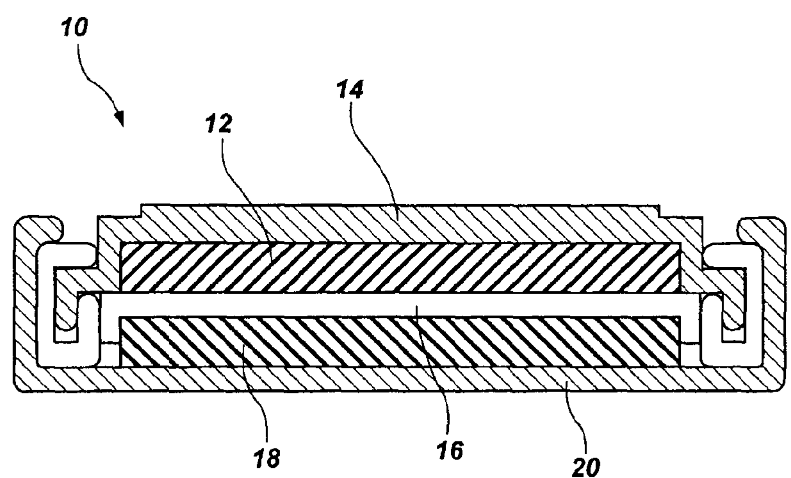
FIG. 1 is a cross-sectional view of an electrochemical cell, in accordance with an embodiment of the present disclosure.

Electrodes including a polyphosphazene cyclomatrix are disclosed, as is a method of forming the electrodes, and electrochemical cells including the electrodes. The polyphosphazene cyclomatrix includes a plurality of phosphazene compounds that are bonded to one another by cross-linkages. As used herein, the term "cyclomatrix" refers to a three-dimensional structure formed from the phosphazene compounds. The three-dimensional structure of the polyphosphazene cyclomatrix may enable ion diffusion and ion intercalation (e.g., by way of ion to nitrogen interactions) into the electrode. The three-dimensional structure of the polyphosphazene cyclomatrix may also enable the incorporation of particles having desired properties (e.g., ion capacity, electrical conductivity) into the electrode.

The following description provides specific details, such as material types, material thicknesses, and processing conditions in order to provide a thorough description of embodiments of the present disclosure. However, a person of ordinary skill in the art would understand that the embodiments of the present disclosure may be practiced without employing these specific details. Indeed, the embodiments of the present disclosure may be practiced in conjunction with conventional techniques employed in the industry. Only those process acts and structures necessary to understand the embodiments of the present disclosure are described in detail below. Additional acts to form at least one of the electrodes and the electrochemical cells may be performed by conventional techniques, which are not described in detail herein. Also, the drawings accompanying the present application are for illustrative purposes only, and are thus not drawn to scale.

As used herein, the terms "comprising," "including," "containing," "characterized by," and grammatical equivalents thereof are inclusive or open-ended terms that do not exclude additional, unrecited elements or method steps, but also include the more restrictive terms "consisting of" and "consisting essentially of" and grammatical equivalents thereof. As used herein, the term "may" with respect to a material, structure, feature or method act indicates that such is contemplated for use in implementation of an embodiment of the disclosure and such term is used in preference to the more restrictive term "is" so as to avoid any implication that other, compatible materials, structures, features and methods usable in combination therewith should or must be, excluded.

As used herein, reference to an element as being "on" another element means and includes the element being directly on top of, adjacent to, underneath, or in direct contact with the other element. It also includes the element being indirectly on top of, adjacent to, underneath, or near the other element with at least one other element present therebetween. In contrast, when an element is referred to as being "directly on" another element, there are no intervening elements present therebetween.

As used herein, the term "electrochemical cell" means and includes a device configured and comprising materials suitable to convert stored chemical energy into electrical energy or electrical energy into chemical energy. The electrochemical cell may include, but is not limited to, a lithium-ion battery or a lithium metal battery.

As used herein, the term "negative electrode" means and includes an electrode having a relatively lower electrode potential in an electrochemical cell (i.e., lower than the electrode potential in a positive electrode therein). The negative electrode receives electrical current during a cell charging process.

As used herein, the term "positive electrode" means and includes an electrode having a relatively higher electrode potential in an electrochemical cell (i.e., higher than the electrode potential in a negative electrode therein).

As used herein, the term "electrode" means and includes a negative electrode or a positive electrode.

As used herein, the term "electrode potential" means and includes an electrochemical potential, or voltage gradient, conventionally measured against a reference electrode, due to the presence of chemical species at different oxidation (valence) states within or in contact with the electrode.

As used herein the term "electrolyte" means and includes an ionic conductor, which can be in a solid state, a liquid state, or a gas state (e.g., plasma).

As used herein, the term "host material" means and includes a material facilitating at least one of the insertion or removal of ions, such as lithium ions, into the material, intercalation of the ions into the material, and reaction of the ions with the material.

As used herein, the term "intercalation" refers to a process wherein an ion inserts into the host material to generate an intercalation compound via a host/guest solid state reduction/oxidation (redox) reaction involving electrochemical charge transfer processes coupled with insertion ions, such as lithium ions. Structural features of the host material are substantially preserved after insertion of the ions via intercalation. In at least some host materials, intercalation refers to a process wherein mobile guest ions are taken up within pores or gaps in the host material.

As used herein, the term "capacity" means and includes a total amount of electrical charge an electrochemical cell, such as a battery, is able to hold. As used herein, the term "specific gravimetric capacity" refers to the capacity output of an electrochemical cell, such as a battery, per unit weight.

In one embodiment of the present disclosure, a negative electrode (i.e., anode) for an electrochemical cell is disclosed. The negative electrode includes a polyphosphazene cyclomatrix. The polyphosphazene cyclomatrix may function at least as a lithium-ion host material for the negative electrode. The polyphosphazene cyclomatrix may also function as a binder for additional materials to be included in the negative electrode. While specific embodiments of the present disclosure describe the electrode as being a negative electrode, a positive electrode may include the polyphosphazene cyclomatrix according to an embodiment of the present disclosure. At least one of the negative electrode and the positive electrode may include the polyphosphazene cyclomatrix. However, the negative electrode and the positive electrode may both include a polyphosphazene cyclomatrix as long as the polyphosphazene cyclomatrices in each are sufficiently different materials that a couple potential is present between the negative electrode and the positive electrode. The polyphosphazene cyclomatrix includes a plurality of cross-linked phosphazene compounds that form a porous scaffold or matrix having a substantially random three-dimensional structure. Each phosphazene compound includes a plurality of phosphorus-nitrogen units, each phosphorus-nitrogen unit includes a bond between a phosphorus atom and a nitrogen atom and at least one pendant group bonded to the phosphorus atom. Each phosphorus-nitrogen unit is bonded to an adjacent phosphorus-nitrogen unit through a phosphorus-nitrogen bond. The phosphazene compound may have the general chemical structure shown below:

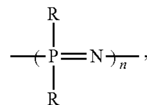

where n is an integer of from 3 to 5; and each R is independently a pendant group having the general chemical structure shown below:

—X-G-L, where X is an oxygen (O) atom, a sulfur (S) atom, or —NH—; and each of G and L is as described below. The pendant group may provide porosity and dimensional stability to the polyphosphazene cyclomatrix, promoting lithium diffusion, lithium intercalation (e.g., by way of lithium to nitrogen interactions), and the incorporation of the particles into the polyphosphazene cyclomatrix, as described in further detail below. As depicted above, the phosphazene compound includes a phosphorus-nitrogen double bond between the phosphorus atom and the nitrogen atom of each phosphorus-nitrogen unit, and a phosphorus-nitrogen single bond between the phosphorus atom and the nitrogen atom of adjacent phosphorus-nitrogen units. However, one of skill in the art will understand (e.g., based on phosphorus-nitrogen bond lengths) that the phosphorus-nitrogen double bond and the phosphorus-nitrogen single bond may each be intermediate between a single bond and a double bond.

Each G group may independently be an aliphatic linkage, a cyclic linkage, —CO—, —$SO_2$—, —SO—, —PO—, —O—, —S—, —NH—, or a combination thereof. As used herein, the term "aliphatic linkage" means and includes a saturated or unsaturated, linear or branched hydrocarbon group, such as an alkylene group, an alkenylene group, and an alkynylene group. The aliphatic linkage may be substituted or unsubstituted. A suitable alkylene group may be a saturated linear or branched hydrocarbon group having from 1 carbon atom to 10 carbon atoms, such as methylene, ethylene, 1,3-propylene, 1,2-butylene, pentylene, hexylene, heptylene, octylene, nonylene, decalene, and substituted derivatives thereof. A suitable alkynylene group may be an unsaturated linear or branched hydrocarbon group including from 2 carbon atoms to 10 carbon atoms and at least one carbon-carbon double bond. A suitable alkenylene group may be an unsaturated linear or branched hydrocarbon group including from 2 carbon atoms to 10 carbon atoms and at least one carbon-carbon triple bond. Optionally, the aliphatic group may include one or more heteroatoms (i.e., an element other than carbon and hydrogen, such as oxygen, nitrogen, sulfur, or silicon). As used herein, the term "cyclic linkage" means and includes at least one closed ring hydrocarbon group, such as an alicyclic group, an arylene group, or a combination thereof. The cyclic linkage may be substituted or unsubstituted. A suitable alicyclic group may be a closed ring hydrocarbon group including from 5 carbon atoms to 8 carbon atoms, such as cyclopentylene, cyclohexylene, cycloheptylene, cyclooctylene, and substituted derivatives thereof. A suitable arylene group may include a closed aromatic ring or closed aromatic ring system, such as phenylene, biphenylene, naphthylene, anthrylene, and substituted derivatives thereof. Optionally, the cyclic linkage may include one or more heteroatoms. By way of non-limiting example, the cyclic linkage may be at least one of a heteroalicylic group and a heteroarylene group, such as furylene, thienylene, pyridylene, isoquinolinylene, indolylene, isoindolylene, triazonlylene, pryrrolylene, tetrazolylene, imidazolylene, pyrazolylene, oxazolylene, thiazolylene, benzofuranylene, benzothiophenylene, carbazolylene, benzoxazolylene, pyrimidinylene, benzimidazolylene, quinozalinylene, benzothiazolylene, naphthyridinylene, isoxazolylene, isothiazolylene, purinylene, quinazolinylene, pyrazinylene, pyridazinylene, triazinylene, tetrazinylene, oxadiazolylene, thiadiazolylene, and substituted derivatives thereof. In at least some embodiments, each G group is phenylene.

Where at least one G group is a substituted cyclic linkage, the substituted group may, by way of non-limiting example, be an alkyl group, an alkoxy group, a heteroalkyl group, a halogenated alkyl group, an alkylene group, or an arylene group. The substituted group may, itself, be substituted or unsubstituted. As used herein, the term "alkyl" means and includes a saturated, straight, branched, or cyclic hydrocarbon containing from 1 carbon atom to 6 carbon atoms, such as methyl, ethyl, propyl, isopropyl, butyl, isobutyl, t-butyl, pentyl, cyclopentyl, isopentyl, neopentyl, hexyl, isohexyl, cyclohexyl, 3-methylpentyl, 2,2-dimethylbutyl, and 2,3-dimethylbutyl. As used herein, the term "alkoxy" means and includes an alkyl group linked to an oxygen atom, such as a methoxy group, an ethoxy group, a propoxy group, a butoxy group, a pentoxy group, a hexoxy group, or an alkoxy-substituted alkoxy group, such as a methoxy ethoxy group or a methoxy ethoxy ethoxy group. As used herein, the term "heteroalkyl group" means and includes an alkyl group including a heteroatom, such as oxygen, sulfur, or nitrogen (with valence completed by hydrogen or oxygen), in the carbon chain or terminating the hydrocarbon chain. As used herein, the term "halogenated alkyl group" means and includes an alkyl group including fluoro, chloro, bromo, or iodo, terminating the hydrocarbon chain. In at least some embodiments, each G group is t-butyl phenylene.

Each L group may be a reactive functional group. As used herein, the term "reactive functional group" means a functional group configured to react with another compound (e.g., an acrylate, vinyl ether, epoxide, alcohol, isocyanate, or halogenated acid) to form a chemical bond under conventional reaction conditions, such as those employed in hydrosilylation, condensation, addition, esterification, etherification, Michael reaction, imidation, amination, sulfonation, and the like. By way of non-limiting example, each L group may independently be an amide group, an amino group, an alkyl halide group, an aldehyde group, a carbonyl group, a carboxyl group, a hydroxyl group, a sulfonyl group, a mercaptan group, or a thiol group. In at least some embodiments, each L group is a hydroxyl group. The reactive functional group may facilitate cross-linking of each phosphazene compound with at least one other phosphazene compound to form the polyphosphazene cyclomatrix, as described in further detail below. At least one atom of the reactive functional group may be incorporated into a cross-linkage of the polyphosphazene cyclomatrix (e.g., the oxygen atom of a hydroxyl group may be a part of an ester group, urea group, urethane group, amide group, ether group, or sulfone group of the cross-linkage), as described in further detail below.

Each phosphazene compound may be cyclic, branched, or linear. In at least some embodiments, each phosphazene compound is cyclic and includes three phosphorus-nitrogen units (n=3). A general structure for each phosphazene compound where n=3 is shown below:

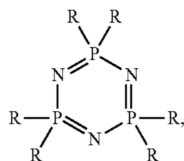

where R is defined as previously described. Each R group may be the same, or at least one R group may be different than at least one other R group. While various embodiments herein describe or illustrate each phosphazene compound as a six-membered cyclic compound (i.e., n=3), each phosphazene compound may be from a six-membered to an eight-membered cyclic compound.

In at least some embodiments, each phosphazene compound is hexa(tert-butylhydroquinone)cyclotriphosphazene ("tbuHQCP"), hexa(hydroquinone)cyclotriphosphazene ("HQCP"), or a derivative thereof. tbuHQCP and HQCP have the following structures, respectively:

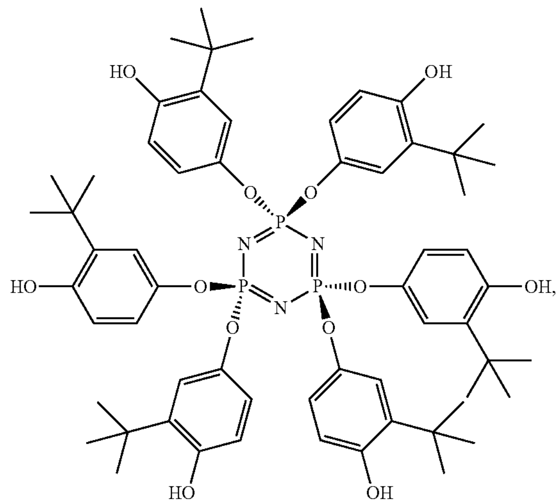

-continued

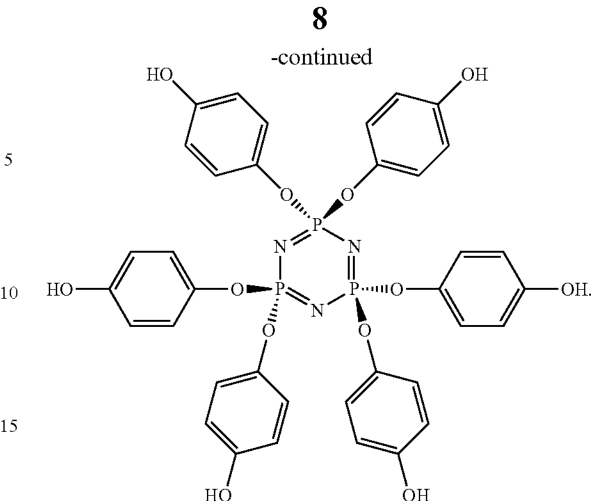

While the illustrated phosphazene compounds include six of the same pendant groups, phosphazene compounds having different pendant groups, as described above, may be produced, depending on the desired properties of the polyphosphazene cyclomatrix, as described below. Thus, each phosphazene compound may be symmetrical or asymmetrical. In addition, configurations of the tbuHQCP are not limited to a tert-butyl substitution at the meta position of the hydroquinone, which results in the tert-butyl group being directed away from the phosphazene molecule. Substitutions at the ortho positions on the aromatic molecule also are suitable. Ortho or meta substitutions by an alkyl group may result in the alkyl group being directed toward the phosphazene ring (i.e., ortho substitution) or away from the phosphazene ring (i.e., meta substitution). In additional embodiments, a configuration of the tbuHQCP may include the hydroxyl group (or another reactive functional group) at the meta position of the hydroquinone, and the tert-butyl group (or another substituted group) at the ortho position or the para position.

Other substituted hydroquinones may be used as at least one pendant group of the phosphazene compound. By way of non-limiting example, at least one pendant group (i.e., the R group, as described above) may be an alkylhydroquinone, such as methylhydroquinone, ethylhydroquinone, tert-butylhydroquinone, isopropyl hydroquinone, n-propylhydroquinone, isobutylhydroquinone, and butylhydroquinone; an alkoxyhydroquinone, such as methoxyhydroquinone, ethoxyhydroquinone, n-propoxyhydroquinone, isopropoxyhydroquinone, n-butoxyhydroquinone, isobutoxyhydroquinone, and t-butoxyhydroquinone; or a halogenated alkylhydroquinone, such as halo-methylhydroquinone, halo-ethylhydroquinone, halo-n-propylhydroquinone, halo-isopropylhydroquinone, halo-n-butylhydroquinone, halo-isobutylhydroquinone, and halo-t-butylhydroquinone.

Each phosphazene compound may be formed by conventional techniques, which are not described in detail herein. By way of non-limiting example, if each phosphazene compound is a six-membered cyclic compound, the phosphazene compound may be synthesized by a nucleophilic substitution reaction of at least one organic nucleophile having the desired pendant group(s) with hexachlorocyclotriphosphazene (also known as phosphonitrilic chloride trimer), which is commercially available, such as from Sigma-Aldrich Co. (St. Louis, Mo.). The nucleophilic substitution reaction is conducted by conventional techniques and, therefore, is not described in detail herein. By adjusting the reaction conditions, such as temperature and solvent, the desired pendant groups may be bonded to the phosphorus atoms of the phosphazene compound.

The polyphosphazene cyclomatrix includes a plurality of cross-linkages. As used herein, the term "cross-linkage" means and includes a chemical interaction joining (i.e., bonding) together more than one molecule, or more than one portion of a long molecule. The plurality of cross-linkages may bond two or more phosphazene compounds of the plurality of phosphazene compounds. Each cross-linkage of the plurality of cross-linkages may, for example, include an ester group (—C(O)—O—), a urea group (—N(H)—C(O)—N(H)—), a urethane group (—N(H)—C(O)—O—), an amide group (—N(H)—C(O)—), an ether group (—O—), a sulfone group (—S($O_2$)—), a methylene group (—$CH_2$—), or a combination thereof. By way of non-limiting example, each cross-linkage of the plurality of cross-linkages may be a diester, a diurea, a diurethane, a diamide, a diether, or a disulfone. As a non-limiting example, each cross-linkage between the phosphazene compounds may include one of the general chemical structures shown below:

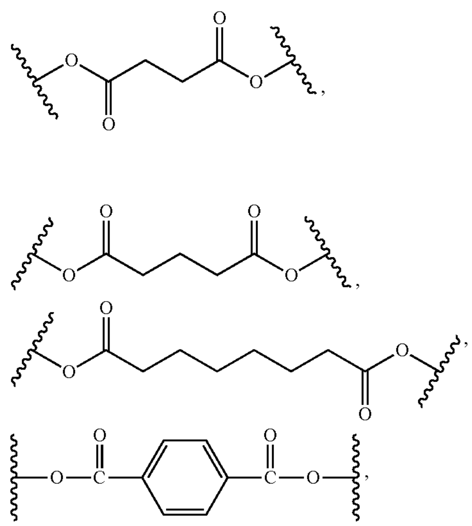

-continued

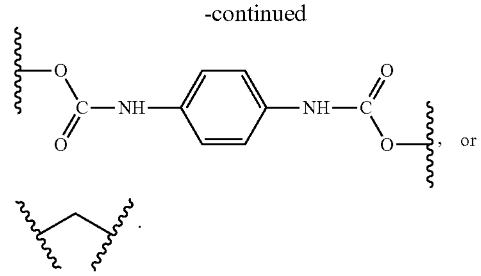

In at least some embodiments, each cross-linkage is a diurethane including an at least one aromatic ring. At least one atom of the reactive functional group (i.e., the L group, as described above) of the phosphazene compound may become incorporated into the cross-linkage bonding one phosphazene compound with another phosphazene compound. By way of non-limiting example, the oxygen atom of a hydroxyl group of a phosphazene compound may form part of an ester group, urea group, urethane group, amide group, ether group, or sulfone group of a cross-linkage joining the phosphazene compound with another phosphazene compound. In additional embodiments, the reactive functional group and the cross-linkage may be distinct. As a non-limiting example, the cross-linkage may be a methylene group formed between two phenolic hydroxyl moieties (e.g., using conventional phenol formaldehyde methodologies), as shown below:

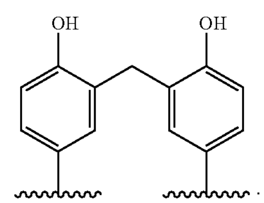 [SMILES: *c1ccc(O)c(Cc2cc(*)ccc2O)c1]

The cross-linkages may be formed by exposing the phosphazene compounds to at least one of a cross-linking agent, heat, and radiation (e.g., ultraviolet-ray, electron beam, γ-ray, etc.), as described in more detail below.

By way of non-limiting example, if each phosphazene compound of the plurality of phosphazene compounds is a six-membered cyclic compound, the polyphosphazene cyclomatrix may have the general chemical structure shown below:

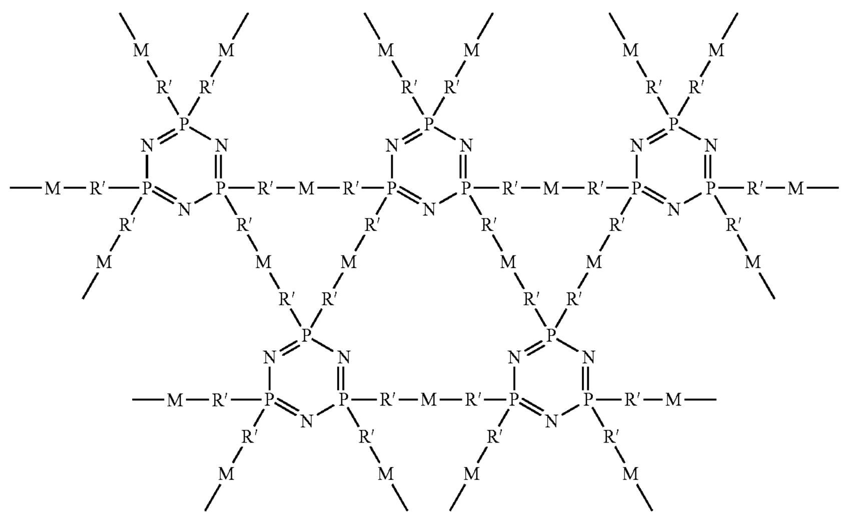

where each R' is independently an R group that has undergone a cross-linking reaction (e.g., a chemical reaction between an L group and a functional group of a cross-linking agent); and each M is independently a cross-linkage.

The polyphosphazene cyclomatrix has a three-dimensional structure in which polymerization may occur in all directions. Each R group may independently be substantially coplanar with or substantially non-coplanar with (e.g., be located above or below) a plane defined by a proximate phosphazene ring. In contrast, conventional organic polymers generally have a two-dimensional structure. Multiple components of the polyphosphazene cyclomatrix (e.g., components of the R' groups and the M groups) contribute to the three-dimensional structure of the polyphosphazene cyclomatrix by providing steric bulk, thus preventing collapse of the polyphosphazene cyclomatrix into a two-dimensional structure. The R' groups and the M groups may provide steric bulk to the polyphosphazene cyclomatrix. The three-dimensional structure enables the polyphosphazene cyclomatrix to have a random structure including substantial and tortuous pores or void spaces, which may serve as diffusion pathways for lithium intercalation. For example, the pores enable lithium-ion diffusion into the polyphosphazene cyclomatrix, promoting interactions between the lithium ions and the nitrogen atoms of each cross-linked phosphazene compound (e.g., by way of lithium-ion interaction with an electron lone pair of each of the nitrogen atoms), which facilitates a relatively large reversible lithium capacity for the phosphazene cyclomatrix. The polyphosphazene cyclomatrix may, for example, incorporate from about 3 lithium ions to about 6 lithium ions per phosphazene ring, accounting for lithium ions between phosphazene rings and for lithium ions proximate cross-linkages. Specific functionality (e.g., at least one of functional groups on the polyphosphazene cyclomatrix and the particles in the polyphosphazene cyclomatrix) can also be provided within the pores to enhance one or more characteristics (e.g., reversible lithium capacity) of the negative electrode, as described in more detail below. The size of the pores may also be tailored (e.g., by appropriately selecting at least one of the R' group and the M group) to limit or prevent electrolyte solvent penetration (e.g., solvent co-intercalation) into at least a portion of the polyphosphazene cyclomatrix, and hence limit or prevent irreversible capacity losses. By way of non-limiting example, portions of the pores located between adjacent phosphorus-nitrogen units of each cross-linked phosphazene compound of the polyphosphazene cyclomatrix may each have a diameter of less than or equal to about 10 Angstroms (Å), while lithium ions have a diameter of about 1.3 Å. Conversely, other portions of the pores (e.g., portions located between adjacent cross-linked phosphazene compounds of the polyphosphazene cyclomatrix) may each have a diameter of greater than or equal to about 10 Å to facilitate a desired amount of electrolyte (e.g., lithium salt) permeation and ionic conductivity within the polyphosphazene cyclomatrix. In addition, the random structure of the polyphosphazene cyclomatrix may enable lithium ions to be inserted into the polyphosphazene cyclomatrix at different energy levels, enabling energy to be spread out over a voltage range.

The polyphosphazene cyclomatrix may be tailored to achieve at least one of a specific electrical conductivity, electrochemical performance, stability (e.g., thermal, electrical, mechanical), interfacial compatibility (e.g., compatibility with a given electrolyte), energy storage capacity, elasticity, and porosity of the negative electrode. As a non-limiting example, at least one of boron (B), phosphorus (P), arsenic (As), antimony (Sb), aluminum (Al), magnesium (Mg), gallium (Ga), and calcium (Ca) may be bonded to the polyphosphazene cyclomatrix to increase reversible capacity for lithium. In addition, at least one electrically conductive functional group may be bonded to the polyphosphazene cyclomatrix. As a non-limiting example, at least one of carbon black, amorphous carbon, and a conductive polymer (e.g., polyvinylpyrrolidine, a polythiophene, etc.) may be bonded to the polyphosphazene cyclomatrix. The above functionalities may be added before the formation of the polyphosphazene cyclomatrix (e.g., bonding desired functional groups to at least one of a cross-linking agent and pendant groups of one or more phosphazene compounds), after the formation of the polyphosphazene cyclomatrix (e.g., bonding desired functional groups to the cross-linked phosphazene compounds of the polyphosphazene cyclomatrix), or a combination thereof.

The negative electrode may further include particles dispersed within the pores of the polyphosphazene cyclomatrix. The particles may include particles of one or more materials, based on desired properties of the negative electrode. By way of non-limiting example, the particles may include particles of at least one material that may increase the reversible lithium capacity of the negative electrode, such as particles of silicon (Si), germanium (Ge), tin (Sn), aluminum (Al), alloys thereof, and oxides thereof. Particles of Si, for example, may reversibly bond up to about 1.5 lithium atoms per atom of Si. As an additional non-limiting example, the particles may include particles of at least one material that may facilitate one or more of a desired energy storage capacity and a desired cycling rate, such as particles of intercalative graphite. The porosity and elasticity of the polyphosphazene cyclomatrix may provide sufficient space for particles of the at least one material to change volume (e.g., expand/contract) during charging and discharging cycles of the electrochemical cell. Polyphosphazene cyclomatrix may thus facilitate high energy density negative electrodes having relatively longer cycle life as compared to conventional negative electrodes (e.g., by reducing or eliminating the physical electrode fracturing and degradation that can result from repeated expansion and contraction of particles during charge and discharge by absorbing the dimensional changes and remaining flexible enough to not fracture during operation). The plurality of particles may also include particles of at least one electrically conductive material, such as a carbonaceous material (e.g., graphite, synthetic graphite, hard carbon, activated carbon, mesophase carbon, carbon blacks, pyrolytic carbon, glassy carbon, coal, coke, diamond, fullerenes, and combinations thereof) and a conductive polymer (e.g., at least one of a conductive polyaniline, polyacetylene, poly(3,4-ethylenedioxythiophene), polypyrrole, polythiophene, poly(p-phenylene), poly(triphenylene), polyazulene, polyfluorene, polynaphthalene, polyanthracene, polyfuran, polycarbazole, tetrathiafulvalene-substituted polystyrene, ferrocence-substituted polyethylene, carbazole-substituted polyethylene, polyoxyphenazine, polyacenes, and poly(heteroacenes)). In addition, the plurality of particles may include particles of at least one lithium salt, such as lithium perfluorosulfonate salts, $LiPF_6$, LiTFSI, LiCl, LiBr, LiI, LiBOB, $LiBF_4$, $LiAsF_6$, $LiCF_3SO_3$, and $Li_2C_2O_4$. In at least some embodiments, the particles include particles of Si and carbon black. Each of the particles may have a diameter of less than or equal to about 100 nanometers (nm), such as a diameter within a range of from about 1 micron (μm) to about 100 μm, such as from about 1 μm to about 50 μm, or from about 1 μm to about 20 μm, or from about 5 μm to about 10 μm. Particle diameters may be tailored to attain a negative electrode having a desired balance between cycling rate capabilities and energy storage capacity.

A ratio of the polyphosphazene cyclomatrix to the particles may be varied to attain a negative electrode having a particular property or characteristic (e.g., at least one of relatively improved electrical conductivity, relatively improved energy loading, and relatively larger surface area). By way of non-limiting example, the negative electrode may include from about 0 percent by weight to about 50 percent by weight of the particles, such as from about 5 percent by weight to about 40 percent by weight, or from about 10 percent by weight to about 30 percent by weight; and from about 100 percent by weight to about 50 percent by weight of the polyphosphazene cyclomatrix, such as from about 95 percent by weight to about 60 percent by weight, or from about 90 percent by weight to about 70 percent by weight. A ratio of particles of different materials within the plurality of particles may also be varied as desired. As a non-limiting example, the negative electrode may include from about 0 percent by weight to about 30 percent by weight of particles that increase the reversible lithium capacity (e.g., Si particles) of the negative electrode, and from about 0 percent by weight to about 30 percent by weight of particles that increase the electrically conductivity (e.g., a carbonaceous material) of the negative electrode. Other ratios of the polyphosphazene cyclomatrix to the plurality of particles are envisioned. In at least some embodiments, the negative electrode includes about 70 percent by weight polyphosphazene cyclomatrix, about 10 percent by weight carbon black particles, and about 20 percent by weight Si particles.

The negative electrode may, optionally, include at least one additional polyphosphazene cyclomatrix. The at least one additional polyphosphazene cyclomatrix may facilitate a gradient of one or more properties throughout a thickness of the negative electrode. By way of non-limiting example, the negative electrode may include a first polyphosphazene cyclomatrix having a first set of properties (e.g., specific electrical conductivity, electrochemical performance, stability, energy storage capacity, porosity, elasticity, etc.) and a second polyphosphazene cyclomatrix having one or more different properties than the first polyphosphazene cyclomatrix (e.g., a different porosity, a different elasticity, etc.). The at least one additional polyphosphazene cyclomatrix may, for example, facilitate at least one of a desired cycling efficiency and a desired three-dimensional electronic conductivity for the negative electrode. If present, the at least one additional polyphosphazene cyclomatrix may be provided on at least one surface of at least one other polyphosphazene cyclomatrix of the negative electrode (e.g., the second polyphosphazene cyclomatrix may be provided on at least one surface of the first polyphosphazene cyclomatrix).

The negative electrode may be provided on at least one surface of an electrically conductive material, which may function as a negative electrode current collector. The electrically conductive material may include aluminum (Al), copper (Cu), zinc (Zn), nickel (Ni), cobalt (Co), palladium (Pd), iron (Fe), platinum (Pt), tin (Sn), ruthenium (Ru), stainless steel, alloys thereof, woven graphite, and combinations thereof. The current collector may be at least one of a foil and a grid. The negative electrode current collector may, optionally, include a base substrate that is non-conductive, such as a glass, Si, plastic, or polymer, having the electrically conductive material formed thereon. The electrically conductive material may be formed on the base substrate by conventional techniques including, but not limited to, physical vapor deposition (PVD), electrochemical plating (ECP), electroless plating, and the like. In at least some embodiments, the negative electrode current collector is Cu foil. The negative electrode current collector may be of any shape (e.g., round, rectangular, square, flag-shaped, etc.) depending on a desired cell design. A thickness of the negative electrode current collector may be within a range of from about 10 microns (μm) to about 150 μm, such as from about 20 μm to about 50 μm. A thickness of the negative electrode formed on the negative electrode current collector may be with a range of from a few microns to several hundred microns. By way of non-limiting example, the negative electrode may have a thickness within a range of about 10 μm to about 500 μm on a single side of the negative electrode current collector, such as from about 25 μm to about 250 μm, or from about 25 μm to about 75 μm.

In at least some embodiments, the negative electrode may be formed on the at least one surface of the negative electrode current collector by applying a negative electrode composition including the plurality of phosphazene compounds, the plurality of particles, at least one cross-linking agent, and at least one solvent onto the negative electrode current collector, and then evaporating the solvent to form the negative electrode. A calendaring process (e.g., roll pressing) may, optionally, be used to facilitate at least one of a substantially uniform thickness and a substantially uniform porosity throughout the negative electrode.

The at least one cross-linking agent may be a compound that includes at least two moieties that may react with the reactive functional groups (i.e., the L groups described above) of multiple phosphazene compounds to form the polyphosphazene cyclomatrix. By way of non-limiting example, the at least one cross-linking agent may be a diacid halogen, such as succinyl chloride, glutaryl chloride, suberoyl chloride, and terephthaloyl chloride; a polyvalent isocyanate, such as phenylene diisocyanate, and 4,4'-diphenylmethane diisocyanate; a dialdehyde; a phenol; a substituted phenol; a polyvalent amine, such as hexamethylenetetramine (HMTA), and melamine; a polyvalent imine, such as polyethyleneimine; a polyvalent epoxy, such as polyglycerol, polyglycidyl ether, and allyl glycidyl ether; a haloepoxy, such as epichlorohydrin; a polyvalent metal salt, such as aluminum sulfate; a urea, such as N,N'-dimethylethylolurea; a polyhydric alcohol, such as glycerin; a (meth)acrylamide, such as N,N'-methylenebisacrylamide; a polyvalent (meth)acrylic acid ester, such as trimethylolpropane triacrylate; and a polyvalent vinyl, such as divinylbenzene. The at least one cross-linking agent may be selected based on at least one of desired mechanical properties (e.g., rigidity, porosity), thermal properties (e.g., decomposition temperature), and electrical properties (e.g., electrically conductivity) of the polyphosphazene cyclomatrix. By way of non-limiting example, the at least one cross-linking agent may include one or more aromatic rings to form a relatively rigid polyphosphazene cyclomatrix structure. In at least some embodiments, the at least one cross-linking agent is HMTA. Initiators and curing agents may also be included in the negative electrode composition to adjust at least one of the rate and degree of cross-linking.

The at least one solvent may be any material capable of dissolving or fluidizing the plurality of phosphazene compounds that is sufficiently volatile to enable the negative electrode composition to dry in a reasonable time period following deposition on the negative electrode current collector. By way of non-limiting example, the at least one solvent may be an anhydrous aprotic organic solvent, such as N,N-methylpyrrolidinone (NMP), sulfamides, oxyalkyls, gamma-butyrolactone (GBL), tetrahydrofuran (THF), propylene carbonate (PC), or combinations thereof. Other suitable solvents may include dioxane, 1,3-dioxolane, 1,2-dimethyloxyethane, dimethylsulfoxide, propylene carbonate, dimethyl carbonate, diethyl carbonate, 2-methyl tetrahydrofuran, dioxolane, methyl ethyl carbonate, γ-butyrolactone, dimethyl sulfoxide, acetonitrile, formamide, dimethyl form amide, triglyme(tri (ethylene glycol)dimethyl ether), diglyme (diethylene glycol dimethyl ether), DME (glyme or 1,2-dimethyloxyethane or ethylene glycol dimethyl ether), nitromethane, methylene chloride, chloroform, toluene, methanol, ethanol, acetone or combinations thereof. In at least some embodiments, the at least one solvent is THF.

Various processing equipment may be used to deposit the negative electrode on the negative electrode current collector. By way of non-limiting example, the negative electrode composition may be sprayed or coated onto the negative electrode current collector using at least one conventional application device configured to handle fine particles, such as a chromatography sprayer or an air brush. The at least one application device may include a nozzle having an aperture configured to define the cross-sectional profile (i.e., the cross-sectional area and the cross-sectional shape) of a negative electrode composition spray emitted by the application device. Suitable nozzle aperture designs including symmetric and asymmetric cross-sections are known in the art and may be used.

During the deposition process, one or more of the negative electrode current collector and the at least one application device may be moved to form a substantially uniform thickness of the negative electrode composition on the negative electrode current collector. A chuck may be used to hold and position the negative electrode current collector, and at least one spray device may be positioned and oriented to spray the negative electrode composition toward at least one surface of the negative electrode current collector. As used herein, the term "chuck" means and includes any tool or device configured to temporarily hold and position the negative electrode current collector or a plurality of negative electrode current collectors. The chuck may rotate the at least one negative electrode current collector in either a clockwise or counterclockwise direction while the at least one spray device moves over the at least one negative electrode current collector. In additional embodiments, the chuck may hold the at least one negative electrode current collector in a fixed position while the at least one spray device moves over the at least one negative electrode current collector. In yet additional embodiments, the chuck may be rotated in either a clockwise or counterclockwise direction while the at least one spray device remains in a fixed position over the chuck. The chuck and the at least one spray device may enable the negative electrode composition to be deposited over the at least one surface of the at least one negative electrode current collector in a substantially even manner.

Following the deposition of the negative electrode composition on the at least one negative electrode current collector, the negative electrode composition may be annealed or allowed to dry for a sufficient amount of time for the at least one solvent to evaporate and for the plurality of phosphazene compounds to cross-link and form the polyphosphazene cyclomatrix of the negative electrode. The amount of time may depend on one or more of the at least one solvent used in the negative electrode composition, the at least one cross-linking agent used in the negative electrode composition, and whether or not negative pressure (e.g., a vacuum) is used to accelerate evaporation of the at least one solvent. By way of non-limiting example, the negative electrode composition may be annealed at a temperature within a range of from about 25° C. to about 225° C., such as from about 25° C. to about 150° C., or from about 25° C. to about 75° C., for a period of time within a range of from about five minutes to about 15 hours, such as from about one hour to about 10 hours, or from about one hour to about five hours. In additional embodiments, at least a portion of the plurality of phosphazene compounds in the negative electrode composition may be cross-linked by way of radiation (e.g., ultraviolet-ray, electron beam, γ-ray, etc.) or another mechanism, depending on the reactive functionality of each of the plurality of phosphazene compounds and the at least one cross-linking agent, to form the negative electrode. In further embodiments, the at least one cross-linking agent may be absent from the negative electrode composition, and at least one of heat and radiation may be used to crosslink the plurality of phosphazene compounds by way of radical generation. In yet further embodiments, at least one additional negative electrode composition may be deposited over the negative electrode composition to form multiple layers of negative electrode compositions. The multiple layers of negative electrode compositions may be treated as described above such that the negative electrode includes multiple polyphosphazene cyclomatrices.

In additional embodiments, the negative electrode may be formed on the at least one surface of the negative electrode current collector by depositing a negative electrode composition including the plurality of phosphazene compounds, the plurality of particles and at least one cross-linking agent on the negative electrode current collector. The negative electrode composition may then be thermally pressed under increased temperature to crosslink the plurality of phosphazene compounds and form the polyphosphazene cyclomatrix of the negative electrode. The at least one cross-linking agent may be as described above. The temperature, pressure, and duration of the thermal press may depend on the at least one cross-linking agent used in the negative electrode composition. By way of non-limiting example, the thermal press may be performed at a pressure within a range of from about 500 psi to about 1500 psi, such as from about 750 psi to about 1250 psi, or from about 900 psi to about 1100 psi; at a temperature within a range of from about 100° C. to about 300° C., such as from about 150° C. to about 250° C., or from about 200° C. to about 250° C.; and for a duration within a range of from about 1 minute to about 1 hour, such as from about 5 minutes to about 30 minutes, or from about 10 minutes to about 20 minutes. In at least some embodiments, the thermal press may be performed at about 1000 psi and about 232° C. for about 10 minutes. The absence of a solvent in the thermal pressing process may reduce adverse environmental impacts effectuated by the formation of the negative electrode, as compared to conventional negative electrode formation methods. In further embodiments, dissolved mixtures of the plurality of phosphazene compounds and the at least one cross-linking agent may be partially dried and partially cured to form a partially cured negative electrode composition. The partially cured negative electrode composition may be mixed with the plurality of particles, deposited on the negative electrode current collector, and thermally pressed to form the negative electrode. In yet further embodiments, at least one additional negative electrode composition may be deposited over the negative electrode composition to form multiple layers of negative electrode compositions. The multiple layers of negative electrode compositions may be treated as described above such that the negative electrode includes multiple polyphosphazene cyclomatrices.

Other methods of forming the negative electrode on the negative electrode current collector may be used. By way of non-limiting example, a negative electrode composition may be coated or printed on the negative electrode current collector by way of at least one of vapor deposition, dip-coating, spin-coating, brush-coating, screen printing, offset litho printing, gravure printing, flexographic printing, and pad printing, which are known in the art and are, therefore, not described in detail herein. In addition, regardless of the way the negative electrode is formed on the negative electrode current collector, the amounts of the various components included in the negative electrode compositions described above may be modified based on a variety of factors, such as the viscosity requirements of the chosen deposition method, and the desired characteristics (e.g., electrical conductivity, reversible lithium capacity, operating voltages, etc.) of the negative electrode.

The negative electrode, including the polyphosphazene cyclomatrix, may be used in an electrochemical cell 10, as shown in FIG. 1. The electrochemical cell 10 includes the negative electrode 12 on the negative electrode current collector 14, a separator 16 on the negative electrode 12, a positive electrode 18 (e.g., a cathode) on the separator 16, and a positive electrode current collector 20 on the positive electrode 18. The electrochemical cell 10 may, for example, be a primary battery (i.e., a single charge use battery), or a secondary battery (i.e., a multiple cycling use battery). In at least some embodiments, the electrochemical cell 10 is a secondary lithium-ion battery.

The positive electrode 18 may include a conventional positive electrode lithium-ion host material, such as lithiated cobalt oxide ($LiCoO_2$); lithiated manganese oxides (e.g., $LiMnO_2$, $LiMn_2O_4$); lithiated nickel oxide ($Li_xNiO_2$); lithiated vanadium oxides (e.g., $LiV_2O_5$, $LiV_6O_{13}$); lithiated titanium oxide ($Li_4Ti_5O_{12}$), lithiated mixed oxides of manganese, cobalt, and nickel (e.g., $LiNi_xCo_xMnO_2$, $LiNi_xCo_{2x}MnO_2$); lithiated mixed oxides of nickel, cobalt, and aluminum (e.g., $LiNi_xCo_yAl_2O_2$), lithiated iron phosphate ($LiFePO_4$), lithiated molybdenum phosphate ($LiMoPO_4$); lithiated cobalt phosphate ($LiCoPO_4$); lithiated vanadium phosphates ($Li_3V_2(PO_4)_3$, $LiVOPO_4$); lithiated pyrophosphates (e.g., $LiMP_2O_7$, $LiFe_{1.5}P_2O_7$); lithiated vanadium fluorophosphates (e.g., $LiVPO_4F$, $Li_5V(PO_4)_2P_2$); lithiated aluminum fluorophosphate ($LiAlPO_4F$); lithiated chromium fluorophosphate ($Li_5Cr(PO_4)_2F_2$); lithiated cobalt fluorophosphate ($Li_2CoPO_4F$); lithiated nickel fluorophosphate ($Li_2NiPO_4F$); lithiated silicates (e.g., $Li_2FeSiO_4$, $Li_2MnSiO_4$, $Li_2VOSiO_4$); and metal sulfides (e.g., $FeS_2$, $CoS_2$, $MoS_2$, $TiS_2$). The positive electrode 18 may, alternatively, include a polyphosphazene cyclomatrix as previously described for the negative electrode 12, as long as the negative electrode 12 and the positive electrode 18 have a sufficient difference in potential. In at least some embodiments, the positive electrode 18 is a lithiated mixed oxide of manganese, cobalt, and nickel. The positive electrode current collector 20 may be substantially similar to the negative electrode current collector 14 described above. In at least some embodiments, the positive electrode current collector 20 is Al foil.

The separator 16 may be a porous, electrically insulating material (e.g., a fibrous glass material; at least one porous polymer, such as polyethylene, polypropylene, and combinations thereof; at least one porous ceramic-polymer composite material; and combinations thereof) including an electrolyte solution within pores or void spaces (not shown) therein. The separator 16 provides channels for ion transport between the negative electrode 12 and the positive electrode 18 while keeping the negative electrode 12 and the positive electrode 18 physically separated to prevent an electrical short. The electrolyte solution may include at least one lithium salt and at least one electrolyte solvent. By way of non-limiting example, the at least one lithium salt may be one or more of lithium hexafluorophosphate ($LiPF_6$), lithium hexafluoroarsenate ($LiAsF_6$), lithium tetrafluoroborate ($LiBF_4$), lithium tetrachloroaluminate ($LiAlCl_4$), lithium trifluoromethane sulfonate ($CF_3LiO_3S$), lithium tris(trifluoromethylsulfonyl) methide ($Li[C(SO_2CF_3)_3]$), lithium bis(trifluoromethylsulfonyl)imide ($Li[N(SO_2CF_3)_2]$), lithium tetrafluoroborate ($LiBF_4$), lithium perchlorate ($LiClO_4$), and lithium chloride (LiCl). The at least one lithium salt may permeate pores of each of the negative electrode 12, the separator 16, and the positive electrode 18. The at least one electrolyte solvent may be a non-aqueous material capable of at least partially dissolving the at least one lithium salt. By way of non-limiting example, the at least one electrolyte solvent may be one or more of ethylene carbonate (EC), propylene carbonate, dimethyl carbonate, diethyl carbonate, 2-methyl tetrahydrofuran, dioxolane, tetrahydrofuran, methyl ethyl carbonate (MEC), y-butyrolactone, ethyl propionate, methyl butyrate, dimethyl sulfoxide, acetonitrile, formamide, dimethyl formamide, dimethyl ether, tri(ethylene glycol)dimethyl ether, di(ethylene glycol) dimethyl ether, 1,2-dimethyloxyethane, ethylene glycol dimethyl ether, and nitromethane. The electrolyte solution may have a concentration of the at least one lithium salt with a range of from about 0.5 M to about 1.5 M, such as from about 1.0 M to about 1.5 M, or from about 1.0 M to about 1.2 M. In at least some embodiments, the electrolyte solution includes 1.2 M $LiPF_6$ in a mixture of EC and MEC. The electrolyte solution may be positioned within the separator 16 in contact with at least one of the negative electrode 12 and the positive electrode 18.

With continued reference to FIG. 1, in operation, the electrochemical cell 10 provides electrical energy (i.e., electrical current is discharged) when each of the negative electrode 12 and the positive electrode 18 are electrically coupled to a load (not shown). Under discharge of the electrochemical cell 10, electrons from the polyphosphazene cyclomatrix of the negative electrode 12 flow into the negative electrode current collector 14, through the load (not shown) and the positive electrode current collector 20, and into to the lithium-ion host material of the positive electrode 18. Simultaneously, lithium ions are dissociated, or extracted, from the polyphosphazene cyclomatrix of the negative electrode 12, and flow through the separator 16 and into the lithium-ion host material of the positive electrode 18. The electrolyte solution, positioned within the separator 16 and in contact with at least one of the negative electrode 12 and the positive electrode 18, facilitates the movement of lithium ions from the negative electrode 12 to the positive electrode 18 by way of ionic conduction. The electrochemical cell 10 is charged by electrically coupling an electromotive force (not shown) of suitable polarity to the negative electrode 12 and the positive electrode 18 in lieu of the load (not shown). Electrons originating from the lithium-ion host material of the positive electrode 18 flow from the positive electrode current collector 20, through the negative electrode current collector 14, and into the polyphosphazene cyclomatrix of the negative electrode 12. Meanwhile, lithium ions move from the lithium-ion host material of the positive electrode 18, through the separator 16, and into the polyphosphazene cyclomatrix of the negative electrode 12. Hence, there is reversible electrochemical cycling as lithium ions are intercalated into the lithium-ion host material of the positive electrode 18 when the electrochemical cell 10 is discharged and into the polyphosphazene cyclomatrix of the negative electrode 12 when the electrochemical cell 10 is in the charged state.

The electrochemical cell 10 of the present disclosure may have an average operating cell voltage of greater than or equal to about 3.5 V, such as greater than or equal to about 4.5 V, or greater than or equal to about 5.0 V. The electrochemical cell 10 of the present disclosure may have a specific gravimetric capacity of greater than or equal to about 200 Ah $kg^{-1}$, such as greater than or equal to about 300 Ah $kg^{-1}$, or greater than or equal to about 400 Ah $kg^{-1}$. The electrochemical cell 10 of the present disclosure may have a cycle life of greater than or equal to about 300 cycles, such as greater than or equal to about 600 cycles, or greater than or equal to about 1000 cycles.

To form the electrochemical cell 10, the negative electrode current collector 14, the negative electrode 12, the separator 16, the positive electrode 18, and the positive electrode current collector 20 may be conventionally assembled in alternate layers. The electrochemical cell 10 may be mono-faced or bi-faced and may have a prismatic, folded, wound, cylindrical, or jelly rolled configuration. The electrochemical cell 10 may be placed in a container (not shown) and each of the negative electrode current collector 14 and the positive electrode current collector 20 may be connected to a respective electrical terminal in the container. The electrolyte solution may be added to at least the separator 16 of the electrochemical cell 10 and the electrochemical cell 10 may be sealed.

The negative electrode of the present disclosure advantageously enables increased energy storage capacity, larger average operating voltages, longer cycle life, increased durability, and improved safety as compared to many conventional negative electrodes, such as carbon-based negative electrodes. The negative electrode may be easily tailored (e.g., through the selection of at least one of the addition of chemical moieties on the polyphosphazene cyclomatrix and the incorporation of various particles within void spaces of the polyphosphazene cyclomatrix) to achieve specific energy loadings, temperature attributes, compatibility with electrolyte species, stability over voltage, elasticity, porosity characteristics, and tortuosity characteristics. In addition, the negative electrodes of the present disclosure may be easily formed on current collectors of electrochemical cells using cost-efficient and environmentally conscious methods.

The electrodes and the electrochemical cells disclosed herein may be used in a variety of applications that utilize electronic devices. By way of non-limiting example, the electrodes and the electrochemical cells of the present disclosure may be used in sensors (e.g., identification sensors, fire alarms, smoke detectors, motion detectors, temperature sensors, humidity sensors, chemical sensors, etc.), medical applications (e.g., blood analyzers, pulse oximeters, defibrillators, telemetry systems, external pacemakers, etc.), military applications (e.g., transmitters, surveillance devices, guidance and positioning systems, thermal imaging systems, etc.), electric vehicle applications, motive power applications (e.g., hybrid vehicles, plug-in hybrid vehicles, electric vehicles, etc.), uninterruptible power supply applications, communications applications (e.g., broadcast, audio, visual, etc.), stationary applications (e.g., grid storage), computing applications (e.g., memory backup devices), transportation applications, and metering applications.

The following examples serve to explain embodiments of the present disclosure in more detail. These examples are not to be construed as being exhaustive or exclusive as to the scope of this disclosure.

EXAMPLES

Example 1

Figure 8A:
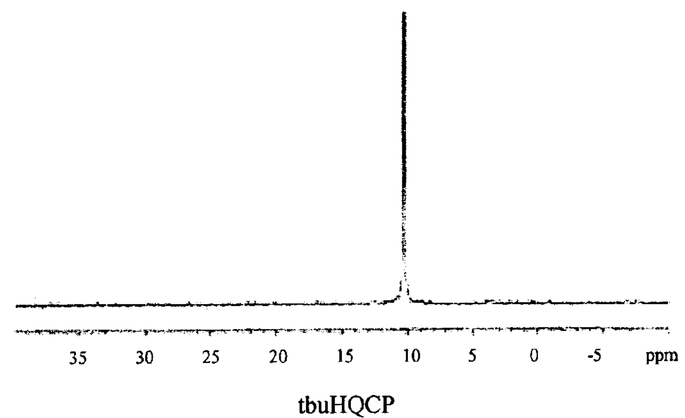
FIGS. 8A and 8B are P-31 NMR graphs ($H_3PO_4$ standard) for tbuHQCP (FIG. 8A) and a precipitate (FIG. 8B), as described in Example 1.
Figure 8B:
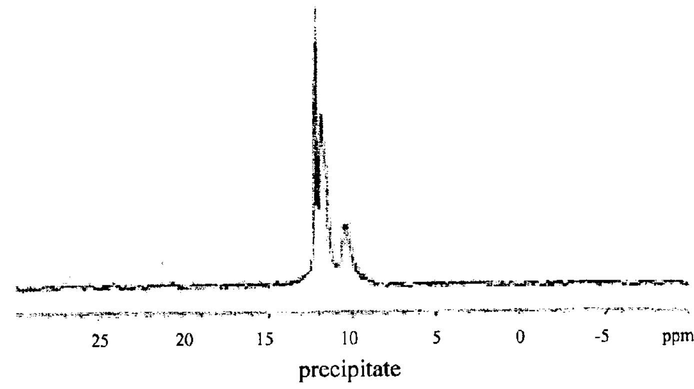

Synthesis of Cross-Linked tbuHQCP Using Succinyl Chloride (4:1 Molar Ratio)

tbuHQCP (3 g, 2.67 mmol) was added to a 250-ml three-neck round-bottom flask equipped with an addition funnel, magnetic stir bar, and a condenser. Anhydrous 1,4-dioxane (150 ml) was added to the flask and the mixture was stirred until the tbuHQCP dissolved to form a solution. Diisopropylethylamine (3.72 ml, 21.4 mmol) was added to the solution, followed by the dropwise addition of a cross-linking agent solution of succinyl chloride (1.20 ml, 10.7 mmol) in 1,4-dioxane (30 ml) using an addition funnel. The resulting mixture was heated to reflux for 15 hours. Upon cooling, a precipitate was evident. The supernate was decanted from the solution and the resulting precipitate was suspended and stirred in water (800 ml) for an hour. The precipitate was collected by way of suction filtration. The precipitate had a dark color. The precipitate was dried at 60° C. in a vacuum oven overnight. The isolated yield of the precipitate was 3.1 g. The precipitate was analyzed. The precipitate was soluble in acetone. Thermal analysis of the precipitate showed a glass transition temperature (Tg) of 127.5° C., decomposition temperatures in $N_2$ purge gas ($Td_{nitrogen}$) of 208.4° C. and 315.5° C., decomposition temperatures in air purge gas ($Td_{air}$) of 182.0° C., 304.7° C., and 464.2° C. The precipitate had a density of 1.167 g/ml. FIGS. 8A and 8B are P-31 NMR graphs ($H_3PO_4$ standard) for tbuHQCP (FIG. 8A) and the precipitate (FIG. 8B). The analysis results indicate the precipitate was cross-linked tbuHQCP.

Example 2

Synthesis of Cross-Linked HQCP Using Succinyl Chloride (10:1 Ratio)

HQCP (3 g, 0.375 mmol) was added to a 250 ml three-neck round-bottom flask equipped with a nitrogen purge and a magnetic stirrer. Anhydrous 1,4-dioxane (150 ml) was added to the flask and the mixture was stirred until the HQCP dissolved to form a solution. Succinyl chloride (422 µl, 3.75 mmol) was added to the solution, followed by diisopropylethylamine (1.30 ml, 7.50 mmol). The resulting mixture was heated to reflux for 15 hours. The mixture cooled and the solvent was poured off to yield a dark colored precipitate. The dark colored precipitate was stirred in water (500 ml), filtered, suspended in acetone, and subsequently filtered. The dark colored precipitate was dried under ambient conditions for three days, followed by drying at 60° C. in a vacuum oven overnight. The isolated yield of the dark colored precipitate was 3.4 g. The dark colored precipitate was analyzed. The precipitate was insoluble in acetone. The dark colored precipitate had a Tg of 128.7° C., a $Td_{nitrogen}$ of 178.0° C. and 319.5° C., a $Td_{air}$ of 160.3° C. and 316.3° C., and a density of 1.368 g/ml. The analysis results indicate the precipitate was cross-linked tbuHQCP.

Example 3

Synthesis of Cross-Linked HQCP Using Terephthaloyl Chloride (4:1 Molar Ratio)

HQCP (5 g, 0.625 mmol) was added to a 250 ml three-neck round-bottom flask equipped with a nitrogen purge and a magnetic stirrer. Anhydrous 1,4-dioxane (150 ml) was added to the flask and the mixture was stirred until the HQCP dissolved to form a solution. Terephthaloyl chloride (0.51 g, 2.5 mmol) was added to the solution, followed by diisopropylethylamine (0.87 ml, 5.00 mmol). The resulting mixture was heated to reflux for 15 hours. Upon cooling, a precipitate was evident in the mixture. The mixture was filtered, and the precipitate was washed with 1,4-dioxane, followed by washing with acetone. The washed precipitate was dried in a vacuum oven at 60° C. overnight. The isolated yield of the precipitate was 4.51 g. The precipitate was analyzed. The precipitate was insoluble in acetone. The precipitate had a Tg of 164.5° C., a $Td_{air}$ of 164.9° C., 379.4° C., and 463.3° C., and a density of 1.405 g/ml. The analysis results indicate the precipitate was cross-linked HQCP.

Example 4

Synthesis of Cross-Linked tbuHQCP Using Terephthaloyl Chloride (4:1 Molar Ratio)

HQCP (5 g, 4.45 mmol) was added to a 250 ml three-neck round-bottom flask equipped with a nitrogen purge and a magnetic stirrer. Anhydrous 1,4-dioxane (150 ml) was added to the flask and the mixture was stirred until the tbuHQCP dissolved to form a solution. Terephthaloyl chloride (3.61 g, 17.8 mmol) was added to the solution, followed by diisopropylethylamine (6.20 ml, 35.6 mmol). The resulting mixture was heated to reflux for 15 hours. Upon cooling, a precipitate was evident in the mixture. The mixture was filtered, and the precipitate was washed with 1,4-dioxane, followed by washing with acetone. The washed precipitate was dried in a vacuum oven at 60° C. overnight. The isolated yield of the precipitate was 2.12 g. The precipitate was analyzed. The precipitate had a Tg of 176.6° C., a $Td_{air}$ of 169.0° C., 256.4° C., and 345.7° C., and a density of 1.375 g/ml. The analysis results indicate the precipitate was cross-linked tbuHQCP.

Example 5

Synthesis of Cross-Linked tbuHQCP Using Phenylene Diisocyanate (8:1 Molar Ratio)

tbuHQCP (5 g, 4.45 mmol) and phenylene diisocyanate (5.7 g, 35.6 mmol) were added to a 250 ml three-neck round-bottom flask equipped with a nitrogen purge and a magnetic stirrer. Anhydrous 1,4-dioxane (150 ml) was added to the flask and the mixture was stirred until the solids dissolved to form a solution. Diisopropylethylamine (12.4 ml, 71.2 mmol) was added to the solution, and the resulting mixture was heated to reflux for 15 hours. Once cooled, the reaction mixture was poured into THF (800 ml) and a precipitate was isolated by centrifugation. The precipitate was then suspended in acetone (1 L), followed by centrifugation and drying at ambient conditions to yield an orange colored solid. The isolated yield of the orange colored solid was 7.87 g. The orange colored precipitate was analyzed. The orange colored precipitate had a Tg of 242.2° C., a $Td_{air}$ of 239.9° C., 308.4° C., and 365.8° C., and a density of 1.204 g/ml. The analysis results indicate the precipitate was cross-linked tbuHQCP.

Example 6

Figures 2A, 2B:
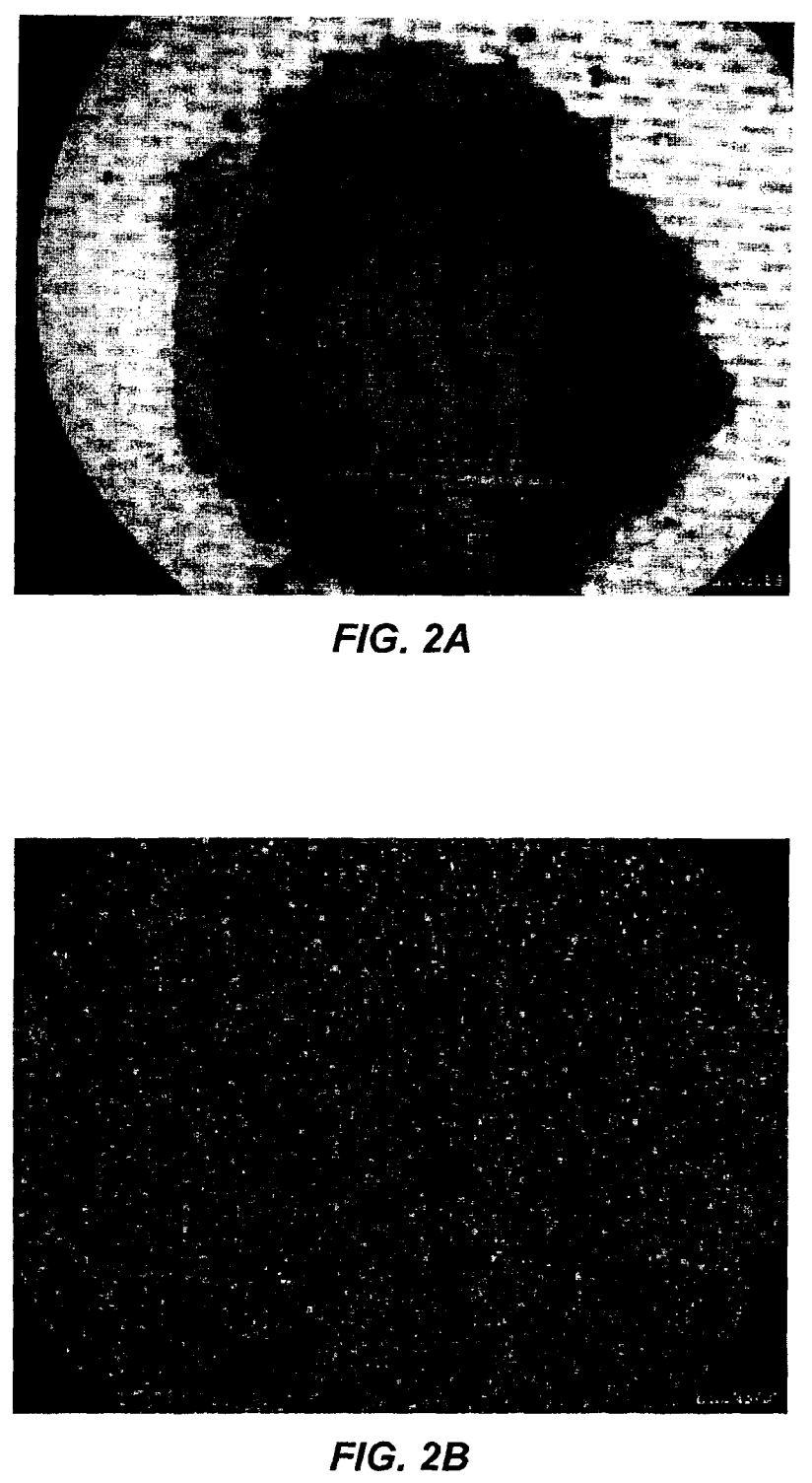

Formation of Negative Electrode by Way of Thermal Pressing tbuHQCP (0.8 g), carbon black (0.1 g), Si (0.1 g), and HMTA (0.08 g) were added to a mortar and pestle and thoroughly ground together to form a fine powder mixture. The fine powder mixture was placed on a #60 mesh screen (approximately 250 μm diameter holes) and held a few inches above the surface of a Ni substrate. The fine powder mixture was sifted through the mesh screen such that an even layer of the fine powder mixture was deposited on the Ni substrate. Spacers were provided adjacent the fine powder mixture on the Ni substrate and a film was provided above and below the structure. The structure was then pressed at 1000 psi at 450° F. for 10 minutes to form a negative electrode on the Ni substrate. FIG. 2A is a low magnification photograph showing a top-down view of the negative electrode. The pressed structure was then transferred to a cold press where it was kept at 1000 psi and cooled. The negative electrode is shown along with some flashing that was generated during the thermal pressing process. FIG. 2B is a higher magnification photograph of the negative electrode, showing a top-down view of the texture of the negative electrode. The texture of the negative electrode thus produced was similar to that of conventional commercial graphite-based negative electrodes.

Example 7

Formation of Negative Electrode by Way of Spray-Coating tbuHQCP (0.8 g), carbon black powder (0.1 g), and Si powder (0.1 g) were mixed together to form a fine powder mixture. THF (10 ml) was added to the fine powder mixture, and the components were stirred and exposed to ultrasonic agitation until the tbuHQCP dissolved. The carbon black and the Si were dispersed within the resulting mixture. Water (0.25 ml) containing HMTA (0.08 g) was added to the mixture to form a negative electrode composition. The negative electrode composition was agitated and delivered into a chromatography sprayer.

Figure 3A:
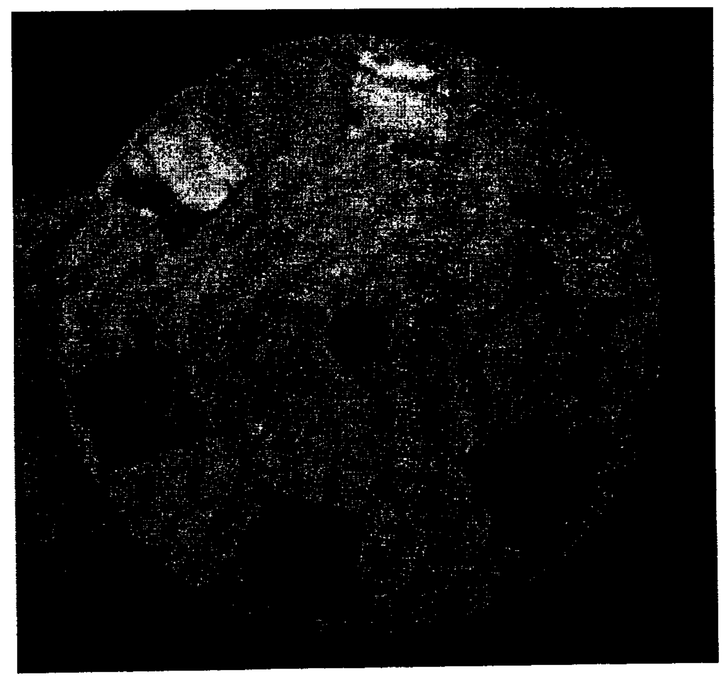
FIG. 3A is a photograph showing a top-down view of distinct copper foils attached to a paper disk prior to deposition of a negative electrode composition thereon, as described in Example 7.
Figure 3B:
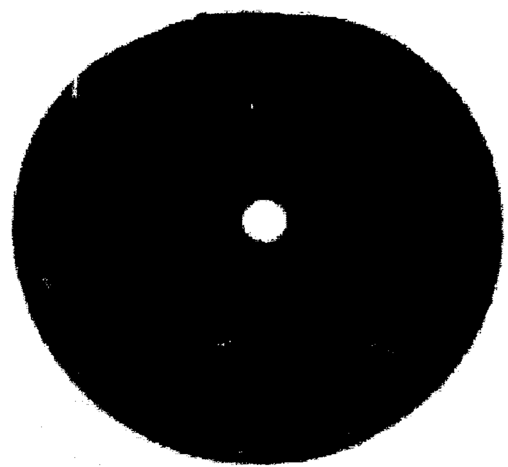
FIG. 3B is a photograph showing a top-down view of the distinct copper foils shown in FIG. 3A following the deposition of the negative electrode composition thereon, as described in Example 7.

Six pieces of Cu foil were attached to a paper disk mounted on a rotatable shaft of a motor. The motor was then activated. The paper disk was rotated at a speed of about 130 rpm. The negative electrode composition was sprayed onto the Cu foil on the paper disk, repeatedly moving the nozzle of the chromatography sprayer to and from each of a position proximate the center of the paper disk and a position proximate the periphery of the paper disk during the spraying process. FIG. 3A illustrates the six pieces of Cu foil attached to the paper disk prior to the deposition of the negative electrode composition. FIG. 3B illustrates the six pieces of Cu foil attached to the paper disk following the deposition of the negative electrode composition on the Cu foil.

Figure 3C:
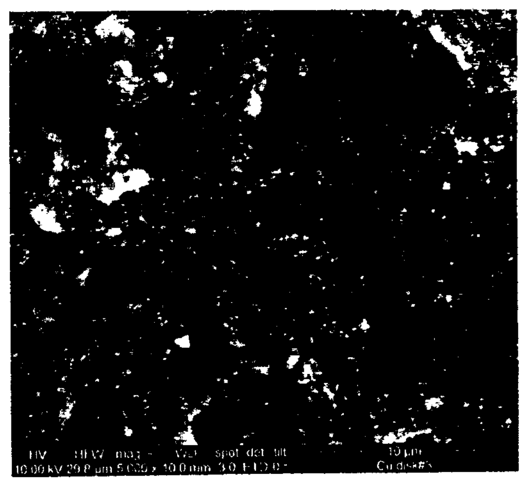
FIG. 3C is a scanning electron micrograph (SEM) showing a top-down view of a surface texture of the negative electrode described in Example 7.
Figure 3D:
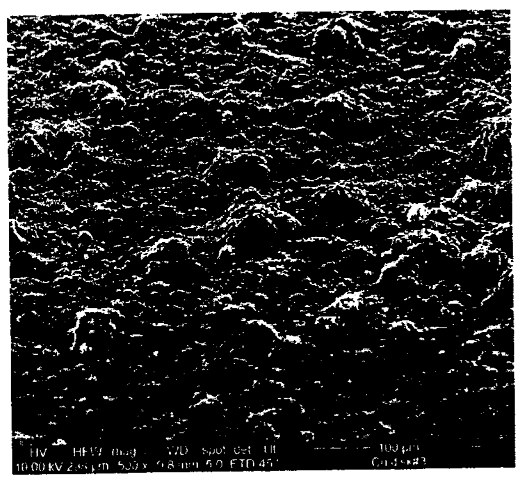
FIG. 3D is a magnified scanning electron micrograph (SEM) showing a top-down view of the surface texture of the negative electrode described in Example 7.

Following the deposition of the negative electrode composition on the Cu foil, a slow annealing process (210° C. for 10 minutes) was performed to remove the THF and form the negative electrode. FIGS. 3C and 3D are scanning electron micrograph (SEM) images (i.e., at 10 k and 100 k magnification, respectively) showing a top-down view of the surface texture of the negative electrode.

Example 8

Cyclic Voltammetry Testing

Figure 4A:
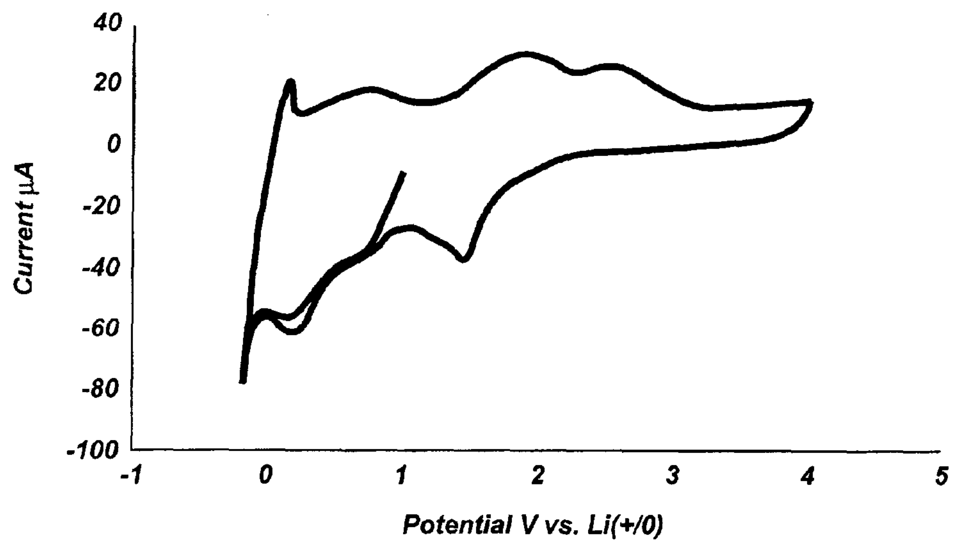
FIG. 4A is a cyclic voltammogram for a negative electrode formed from HQCP (80 wt %), HMTA (1 wt %), carbon black (10 wt %), and elemental silicon (10 wt %) on 1.0 $cm^2$ of Ni foil, as described in Example 9.

Cyclic voltammetry testing was performed at 50 mV/s for a negative electrode sample formed from HQCP (80 wt %), HMTA (1 wt %), carbon black (10 wt %), and elemental silicon (10 wt %, gain size<37 μM) on 1.0 $cm^2$ of Ni foil. FIG. 4A shows the cyclic voltammogram generated from the testing. The cyclic voltammogram indicates that the negative electrode was electrochemically stable over a wide range of voltages. A dip in current as the potential moves negative of 0.0 V indicates negative electrode charging. A rise in current as the potential moves positive of 0.0 V indicates negative electrode discharge.

Example 9

Charge and Discharge Cycling

Figure 4B:
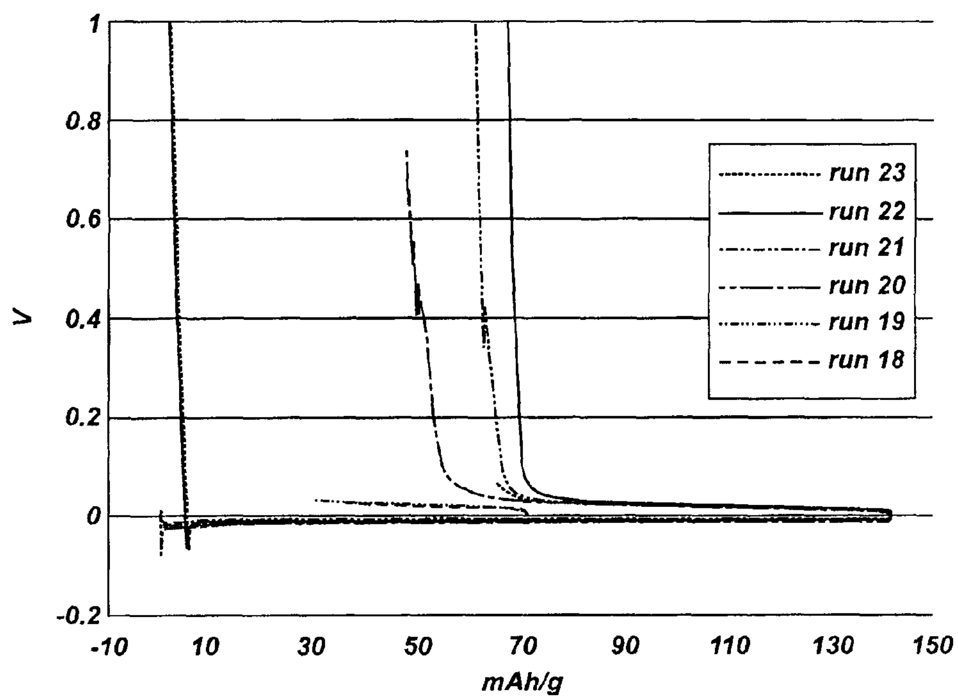
FIG. 4B is a graph of charge and discharge cycling for the negative electrode formed from HQCP (80 wt %), HMTA (1 wt %), carbon black (10 wt %), and elemental silicon (10 wt %) on 1.0 $cm^2$ of Ni foil, as described in Example 9.

The charge (current density between about −0.01 $mA/cm^2$ and -0.5 $mA/cm^2$) and discharge (current density between about 0.01 $mA/cm^2$ and 0.5 $mA/cm^2$) for a negative electrode sample formed from HQCP (80 wt %), HMTA (1 wt %), carbon black (10 wt %), and elemental silicon (10 wt %, grain size<37 μM) on 1.0 $cm^2$ of Ni foil was tested. Multiple test runs were performed, each test run lasting for between about one hour and about 30 hours for about 30 cycles. A graph of some of the testing results is shown in FIG. 4B. The testing results indicate the negative electrode sample could repeatedly charge and discharge at a reasonable negative potential (~0 V vs Li(0/+)) with limited hysteresis (<100 mV) between charge potential and discharge potential. The testing results indicate material capacities of at least 140 mAh/g are achievable (based on total mass of anode laminate.

Example 10

Cycling Performance Over Voltage

Sample negative electrodes including varied concentrations HMTA of cross-linked phosphazene compounds (HQCP and tbuHQCP), carbon black particles, and silicon particles according to Table 1 below were formed on Cu foil according to the process described in Example 6 to fabricate negative electrode structures. Each negative electrode structure was joined with a positive electrode including a lithiated mixed oxide of Mn, Co, and Ni on Al foil, and a separator including 1.2 M $LiPF_6$ in 2:8 ethylene carbonate: methyl ethyl carbonate to form sample rechargeable lithium-ion coin cells. Each sample rechargeable lithium-ion coin cell had a 2032-type coin cell design (20 mm dia. by 3.2 mm height as assembled), wherein the electrodes have an area of about 1.6 $cm^2$ each. About half of the sample rechargeable lithium-ion coin cells had lithium-enriched anode surfaces, wherein at least one small drop of electrolyte was deposited on an exposed anode surface, spread across the exposed surface, then dried prior to cell assembly.

| Sample Number | Phosphazene compound | Carbon black | Silicon (1 μm-5 μm) |
|---|---|---|---|
| 1803-30-5 | 80 wt % HQCP | 10 wt % | 10 wt % |
| 1803-30-6 | 70 wt % HQCP | 10 wt % | 20 wt % |
| 1803-30-7 | 70 wt % HQCP | 20 wt % | 10 wt % |
| 1803-30-8 | 80 wt % tbuHQCP | 10 wt % | 10 wt % |
| 1803-30-9 | 70 wt % tbuHQCP | 10 wt % | 20 wt % |
| 1803-30-10 | 70 wt % tbuHQCP | 20 wt % | 10 wt % |
| 1803-30-11 | 80 wt % tbuHQCP | 20 wt % | 0 wt % |
| 1803-30-12 | 80 wt % HQCP | 20 wt % | 0 wt % |

Figure 5A:
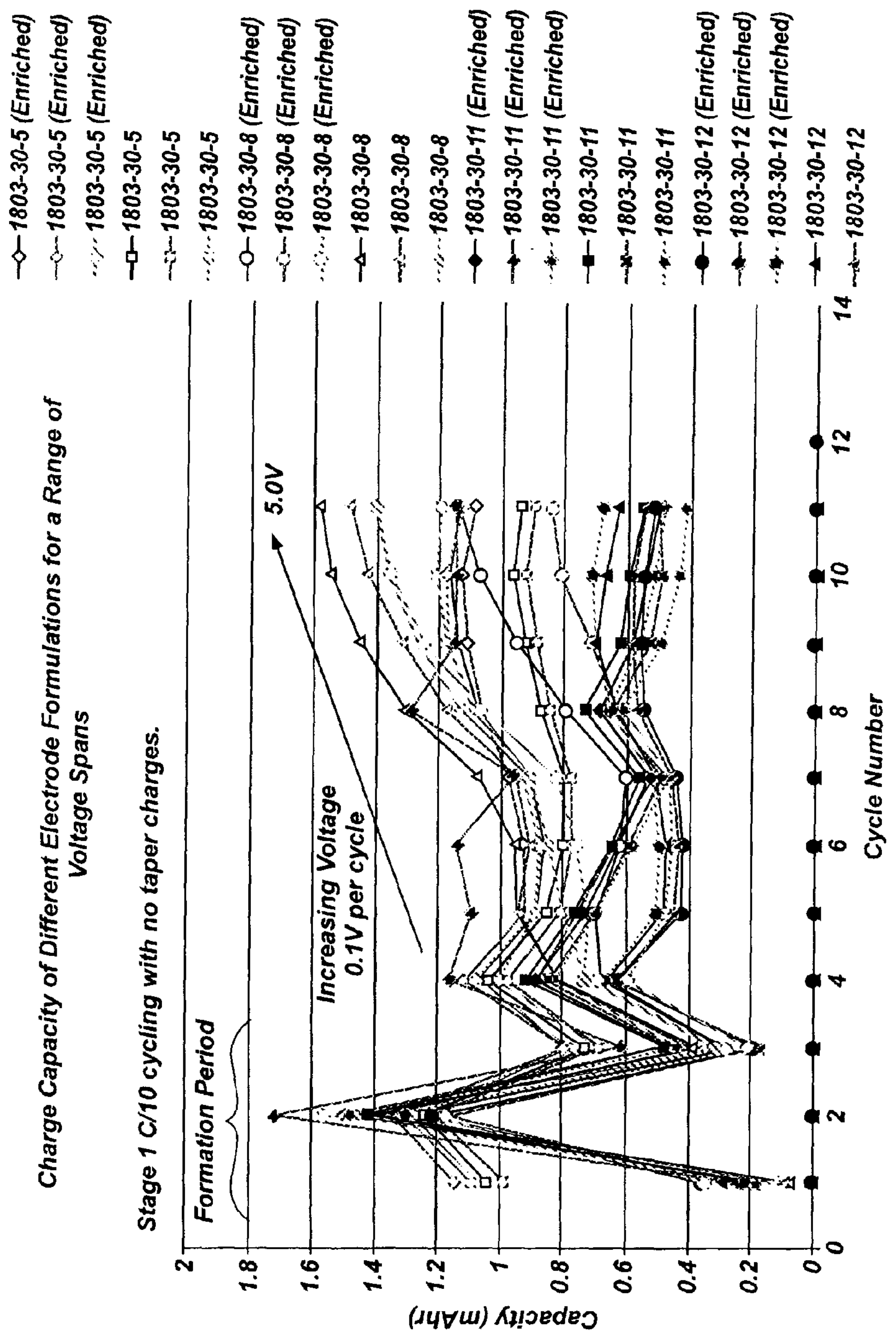
FIG. 5A is a graph of charge capacity for multiple negative electrode samples, as exhibited during cycling to progressively higher voltage without taper charges, as described in Example 10.
Figure 5B:
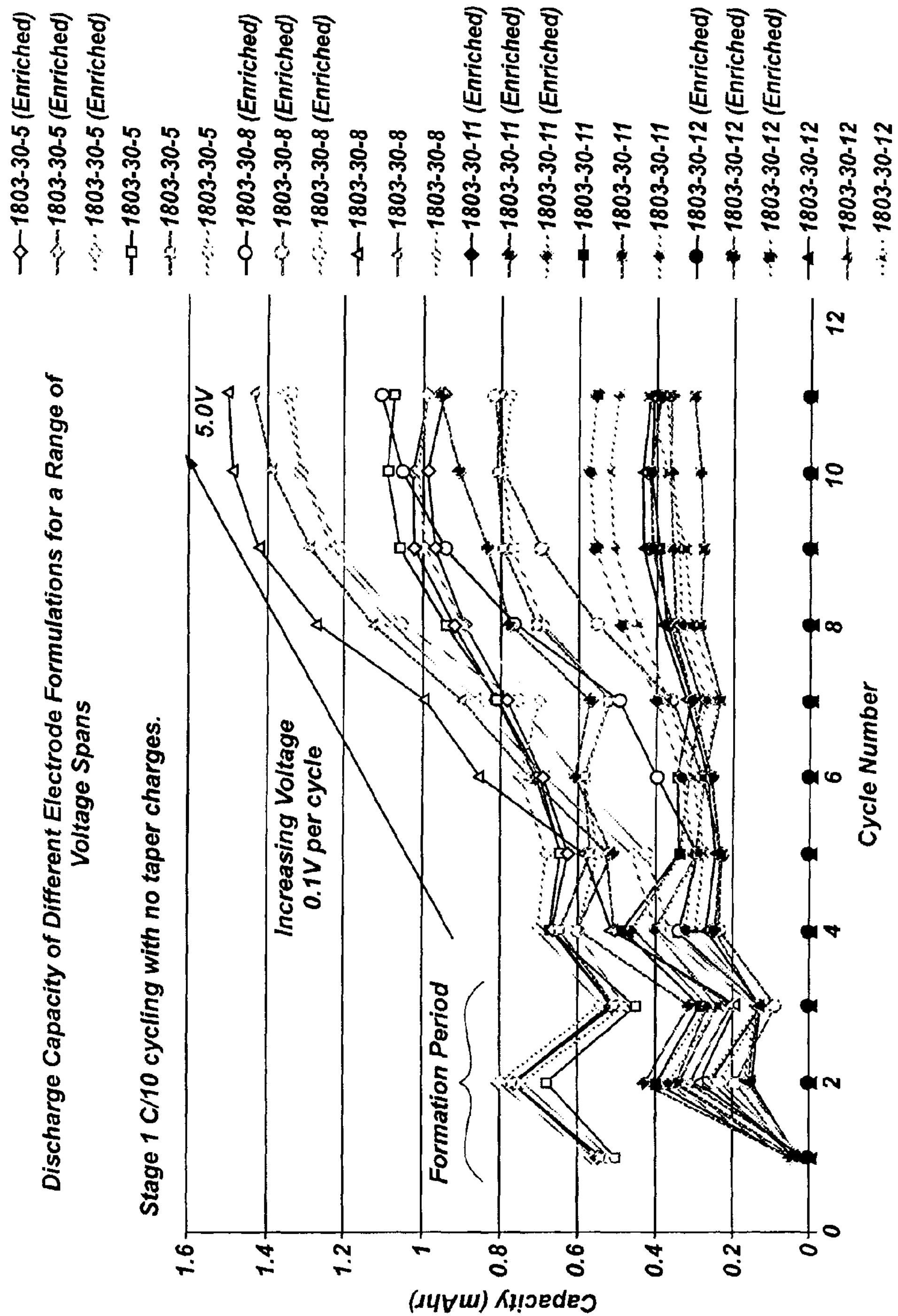
FIG. 5B is a graph of discharge capacity for multiple negative electrode samples, as exhibited during cycling to progressively higher voltage without taper charges, as described in Example 10.
Figure 5C:
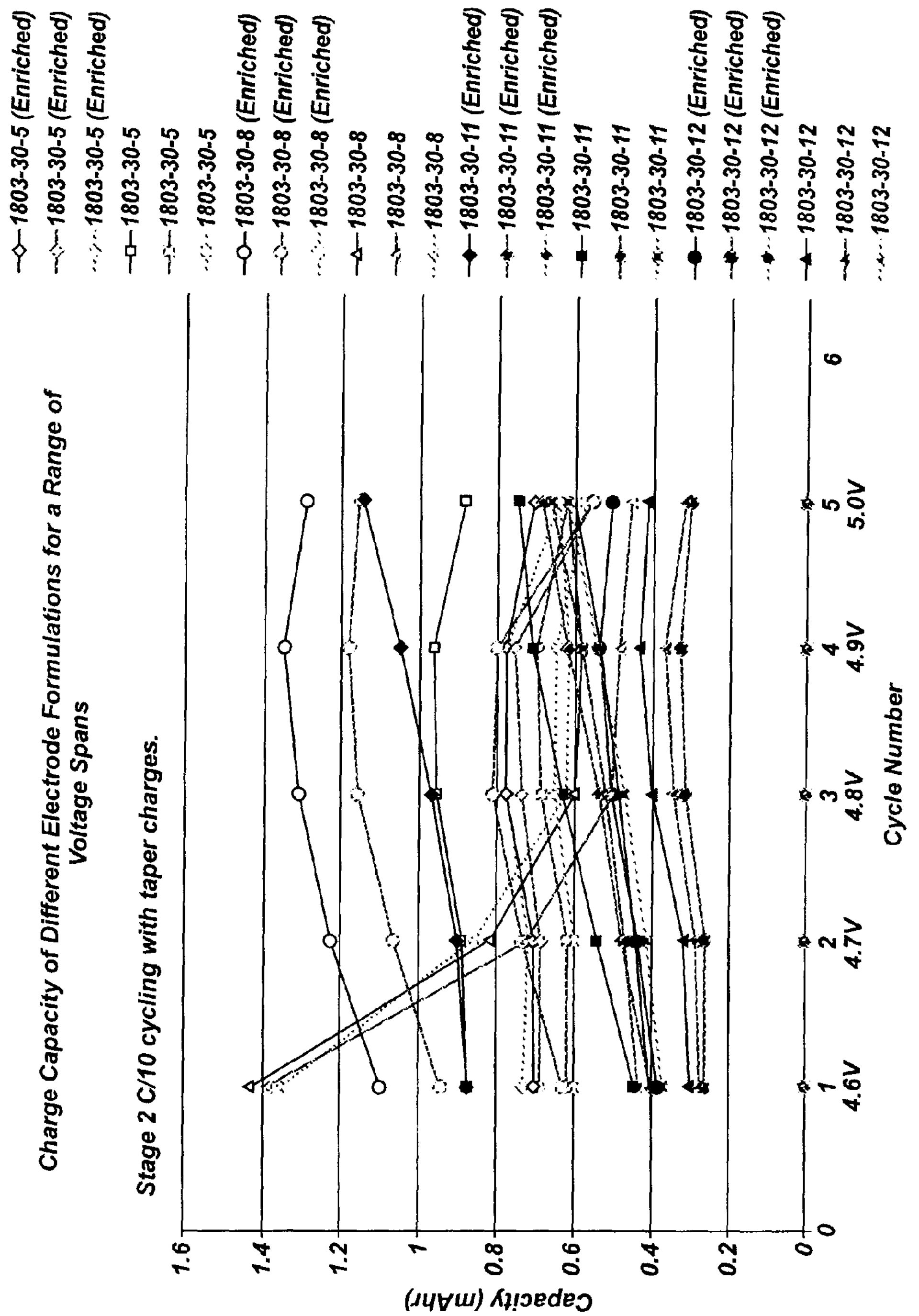
FIG. 5C is a graph of charge capacity for multiple negative electrode samples, as exhibited during cycling to progressively higher voltage with taper charges, as described in Example 10.
Figure 5D:
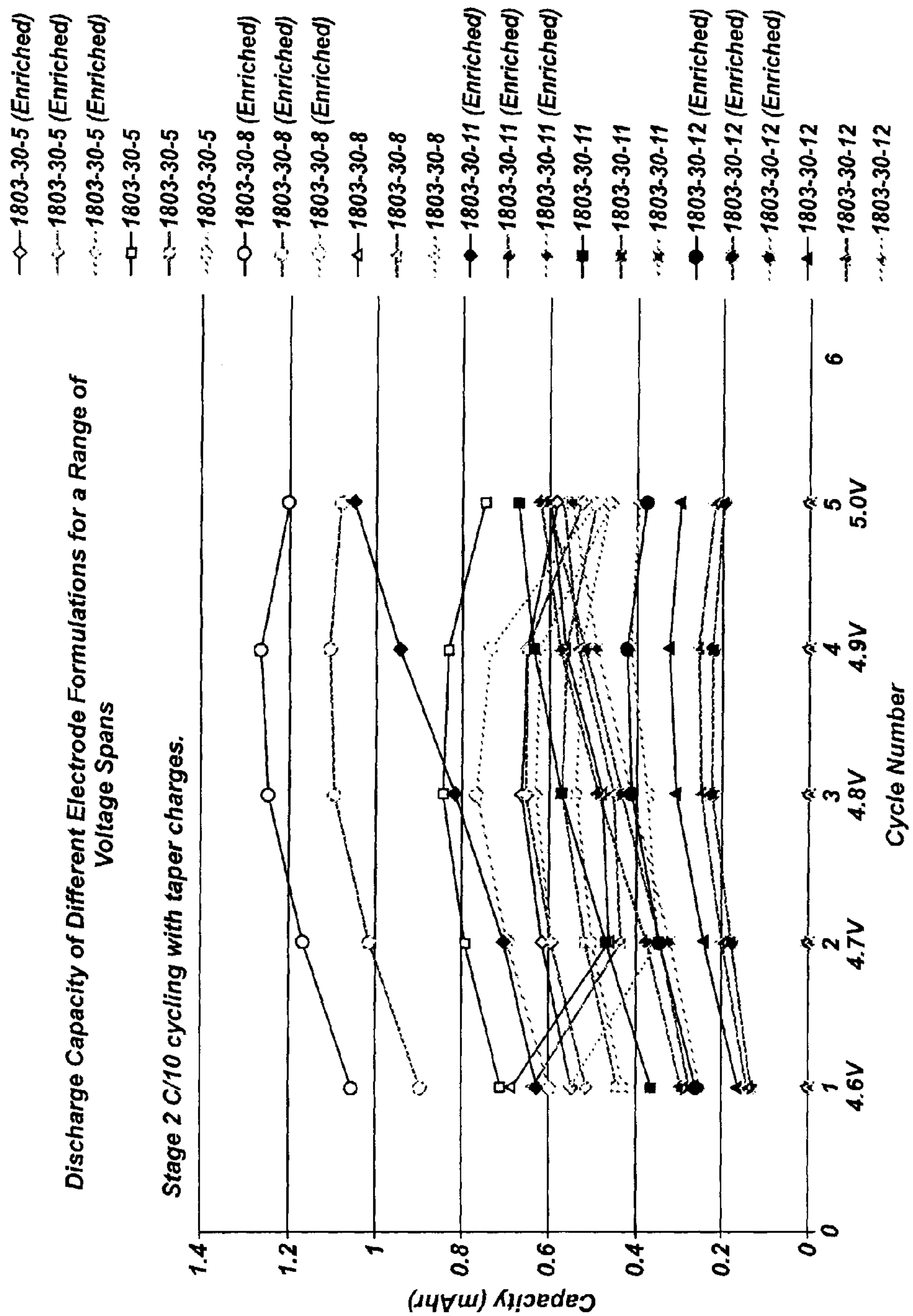
FIG. 5D is a graph of discharge capacity for multiple negative electrode samples, as exhibited during cycling to progressively higher voltage with taper charges, as described in Example 10.

Following formation, each sample rechargeable lithium-ion coin cell was initially tested to determine cycling performance over voltage for both charging and discharging. The voltage was incrementally increased by 0.1 V per cycle to a maximum of 5.0 V. A current of 160 μA was imposed for charge conditions and for discharge conditions, which was estimated to be approximately a C/10 equivalent cycling rate (i.e., a rate at which it would take about ten hours to charge from minimum voltage to maximum voltage, and about ten hours to discharge from maximum voltage to minimum voltage). FIG. 5A is a graph of the charge capacity of each of the negative electrode samples exhibited during cycling to progressively higher voltage (max. 5 V) with no taper charging. FIG. 5B is a graph of the discharge capacity of each of the negative electrode samples exhibited during cycling to progressively higher voltage (max. 5 V) with no taper charging. Following the initial testing, the sample rechargeable lithium-ion coin cells were allowed to rest for about one week. Each sample rechargeable lithium-ion coin cell was then tested again to determine cycling performance over voltage for both charging and discharging in the presence of a taper charge. The voltage was again incrementally increased by 0.1 V per cycle to a maximum of 5.0 V. FIG. 5C is a graph of the charge capacity of each of the negative electrode samples exhibited during cycling to progressively higher voltage (max. 5 V) with taper charging. FIG. 5D is a graph of the discharge capacity of each of the negative electrode samples exhibited during cycling to progressively higher voltage (max. 5 V) with taper charging. The testing results depicted in FIGS. 5A-5D indicate that the negative electrode samples tested gained capacity as voltage was increased. In addition, the testing results indicate that maximum capacity is exhibited at greater than or equal to about 4.8 V for a majority of the negative electrode samples, and at greater than or equal to about 5.0 V for at least some of the negative electrode samples.

Example 11

Differential Capacity

Figure 6A:
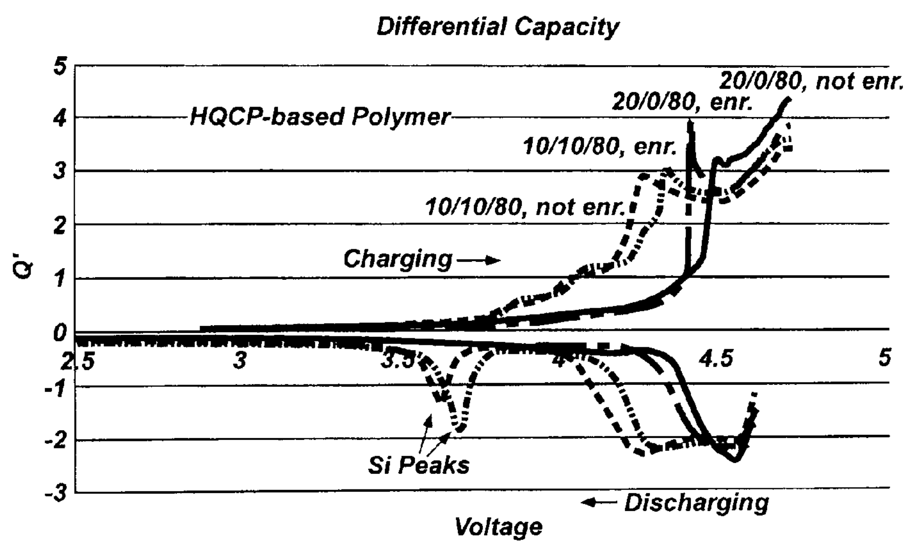
FIG. 6A is a graph of the differential charge capacities and the differential discharge capacities of multiple lithium-enriched and non-lithium-enriched negative electrode samples including carbon black (C65), elemental Si, and cross-linked HQCP, as described in Example 11.
Figure 6B:
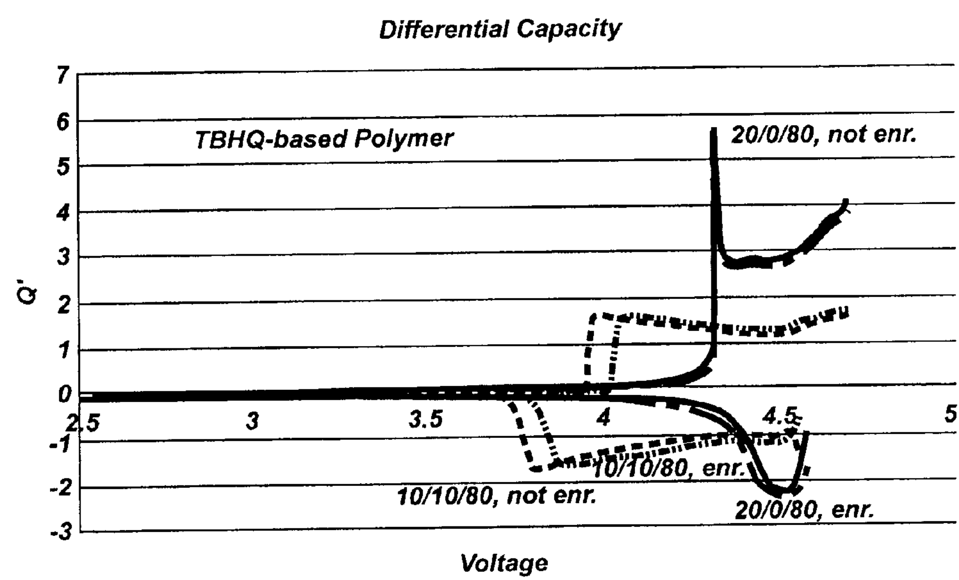
FIG. 6B is a graph of the differential charge capacities and the differential discharge capacities of multiple lithium-enriched and non-lithium-enriched negative electrode samples including carbon black (C65), elemental Si, and cross-linked tbuHQCP, as described in Example 11.

The differential charge capacity and the differential discharge capacity for several negative electrode samples including varied concentrations of HMTA cross-linked phosphazene compounds (HQCP and tbuHQCP), carbon black particles, and silicon particles were analyzed at the C/10 rate. FIG. 6A is a graph of the differential charge capacities and the differential discharge capacities of multiple lithium-enriched and non-lithium-enriched negative electrode samples including carbon black (C65), elemental Si, and HMTA cross-linked HQCP (i.e., in ratios of 10 wt % C65:10 wt % Si:80 wt % HQCP, and 20 wt % C65:0 wt % Si:80 wt % HQCP). FIG. 6B is a graph of the differential charge capacities and the differential discharge capacities of multiple lithium-enriched and non-lithium-enriched negative electrode samples including carbon black (C65), elemental Si, and HMTA cross-linked tbuHQCP (i.e., in ratios of 10 wt % C65:10 wt % Si:80 wt % tbuHQCP; and 20 wt % C65:0 wt % Si:80 wt % tbuHQCP). In FIG. 6B, tbuHQCP is also referred to as TBHQ. The plots in each of FIGS. 6A and 6B indicate the points of demarcation along voltage of relatively increased capacity during the charge and discharge cycles. FIGS. 6A and 6B indicate that a majority of the negative electrode samples have increased capacity within a voltage range of from about 3.7 volts to about 4.7 volts. FIGS. 6A and 6B also indicate that at least some of the negative electrode samples have maximum capacity residing at greater than or equal to about 4.7 volts.

Example 12

Electrochemical Impedance Spectroscopy Analysis

Figure 7A:
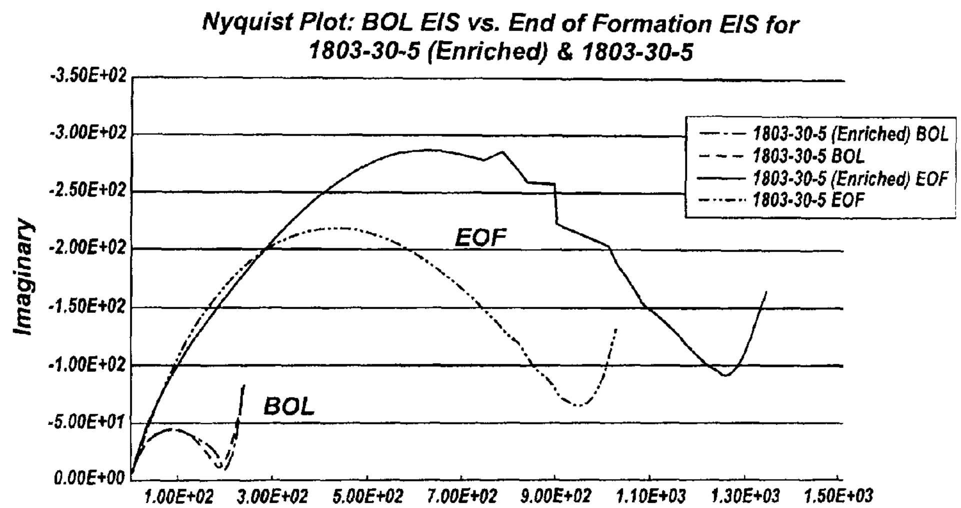
FIGS. 7A-7D are each graphs of electrochemical impedance spectroscopy analysis results for several lithium-enriched sample lithium-ion coin cells and non-lithium-enriched sample lithium-ion coin cells, as described in Example 12.
Figure 7B:
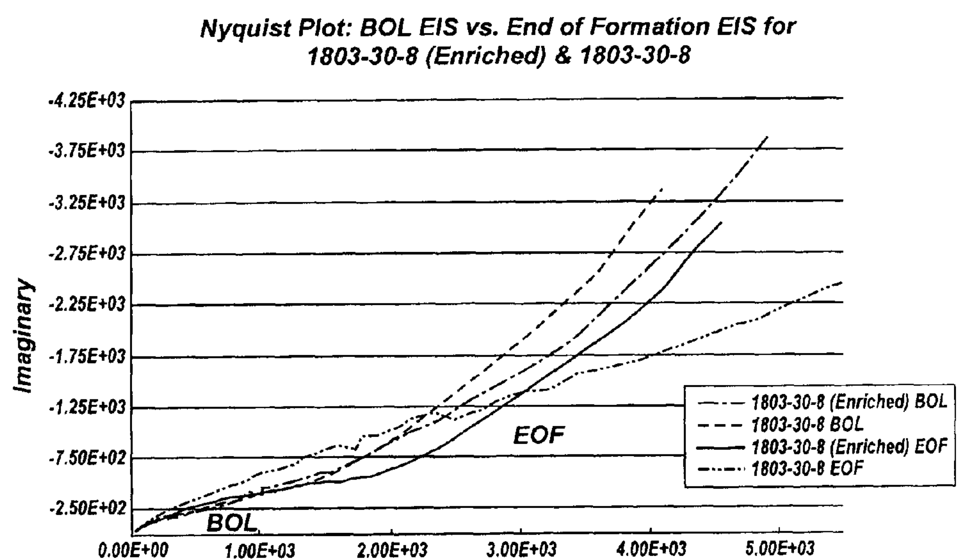
Figure 7C:
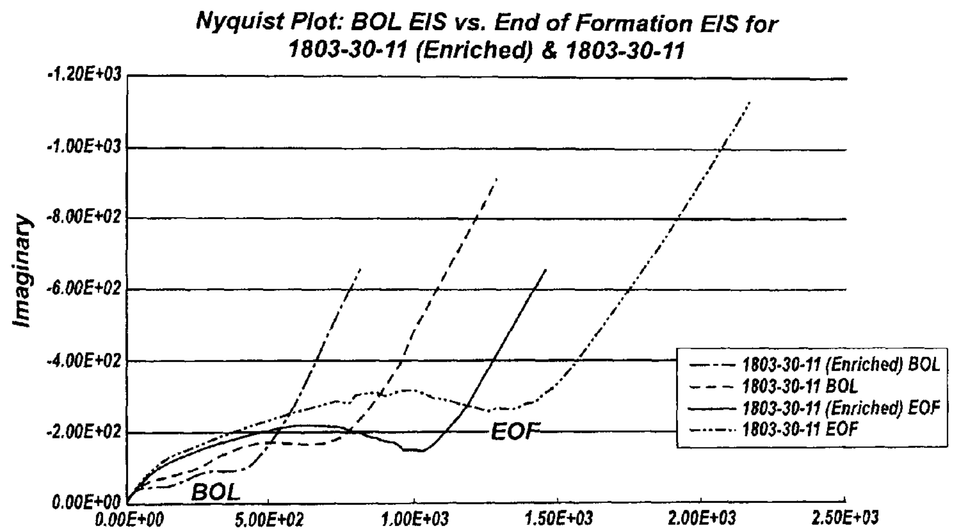
Figure 7D:
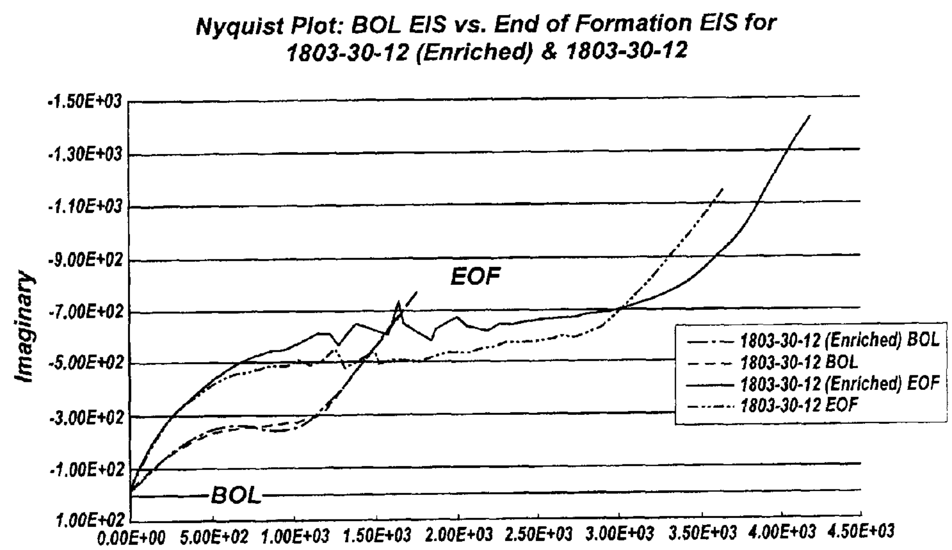

Electrochemical impedance spectroscopy (EIS) analysis was performed for several of the lithium-enriched and non-lithium-enriched versions of the sample rechargeable lithium-ion coin cells of Example 10 to determine an increase in interfacial impedance exhibited by the sample rechargeable lithium-ion cells over the course of a beginning of life (BOL) to end of formation (EOF) cycling period. FIGS. 7A-7D are graphs of the results of such EIS analysis. Interfacial impedance, as quantified by the arc widths along the horizontal axes in each of FIGS. 7A-7D, increased between BOL and EOF in all cases. The magnitude of interfacial impedance was less for sample number 1803-30-5 (FIG. 7A), and the percentage increase was less for sample number 1803-30-11 (FIG. 7C). Lithium enrichment provided relatively lower interfacial impedance for sample 1803-30-11 (FIG. 7C), and relatively higher impedance for sample number 1803-30-5. Sample number 1803-30-12 (FIG. 7D) showed the highest interfacial impedance by EOF. EIS analysis provides insight as to material selection and optimization, as it is a goal is to minimize the increase of interfacial impedance over time.

While the present disclosure is susceptible to various modifications and alternative forms, specific embodiments have been shown by way of example in the drawings and have been described in detail herein. However, the present disclosure is not intended to be limited to the particular forms disclosed. Rather, the present disclosure is to cover all modifications, equivalents, and alternatives falling within the scope of the present invention as defined by the following appended claims and their legal equivalents.

What is claimed is:

1. An electrode, comprising:

a polyphosphazene cyclomatrix configured and formulated for ion intercalation, the polyphosphazene cyclomatrix comprising:

a plurality of cyclic phosphazene compounds, each cyclic phosphazene compound of the plurality of cyclic phosphazene compounds comprising:

a plurality of phosphorus-nitrogen units, each phosphorus-nitrogen unit bonded to an adjacent phosphorus-nitrogen unit; and at least one pendant group bonded to each phosphorus atom of the plurality of phosphorus-nitrogen units; and a plurality of cross-linkages, each cross-linkage of the plurality of cross-linkages bonding the at least one pendant group of one cyclic phosphazene compound of the plurality of cyclic phosphazene compounds with the at least one pendant group of another cyclic phosphazene compound of the plurality of cyclic phosphazene compounds; and particles within pores of the polyphosphazene cyclomatrix.

2. The electrode of claim 1, wherein each cyclic phosphazene compound of the plurality of cyclic phosphazene compounds comprises the following structure:

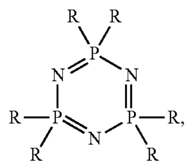

where each R comprises —X—G—L;

where each X independently comprises —O—, —S—, or —NH—;

each G independently comprises an alkylene group, a heteroalkylene group, an alkenylene group, a heteroalkenylene group, an alkynylene group, an heteroalkynylene group, an alicyclic group, a substituted alicyclic group, a heteroalicyclic group, a substituted heteroalicyclic group, an arylene group, a substituted arylene group, a heteroarylene group, a substituted heteroarylene group, —CO—, —$SO_2$—, —SO—, —PO—, —O—, —S—, or —NH—; and each L independently comprises a reactive functional group.

3. The electrode of claim 2, wherein each G independently comprises an alkyl-substituted arylene group, an alkoxy-substituted arylene group, a heteroalkyl-substituted arylene group, or a halogenated alkyl-substituted arylene group.

4. The electrode of claim 2, wherein the reactive functional group comprises an amide group, an amino group, an alkyl halide group, an aldehyde group, a carbonyl group, a carboxyl group, a hydroxyl group, a mercaptan group, or a thiol group.

5. The electrode of claim 1, wherein each cyclic phosphazene compound of the plurality of cyclic phosphazene compounds comprises the following structure:

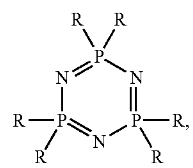

where each R independently comprises a hydroquinone group or a substituted hydroquinone group.

6. The electrode of claim 5, wherein at least one R comprises a methylhydroquinone, ethylhydroquinone, tert-butylhydroquinone, isopropyl hydroquinone, n-propylhydroquinone, isobutylhydroquinone, butylhydroquinone, methoxyhydroquinone, ethoxyhydroquinone, n-propoxyhydroquinone, isopropoxyhydroquinone, n-butoxyhydroquinone, isobutoxyhydroquinone, t-butoxyhydroquinone, halo-methylhydroquinone, halo-ethylhydroquinone, halo-n-propylhydroquinone, halo-isopropylhydroquinone, halo-n-butylhydroquinone, halo-isobutylhydroquinone, or halo-t-butylhydroquinone group.

7. The electrode of claim 1, wherein each cross-linkage of the plurality of cross-linkages comprises an ester group, a urea group, a urethane group, an amide group, an ether group, or a sulfone group.

8. The electrode of claim 1, wherein each cross-linkage of the plurality of cross-linkages comprises at least one of a diester, a diurea, a diurethane, a diamide, a diether, and a disulfone.

9. The electrode of claim 1, wherein each cross-linkage of the plurality of cross-linkages comprises:

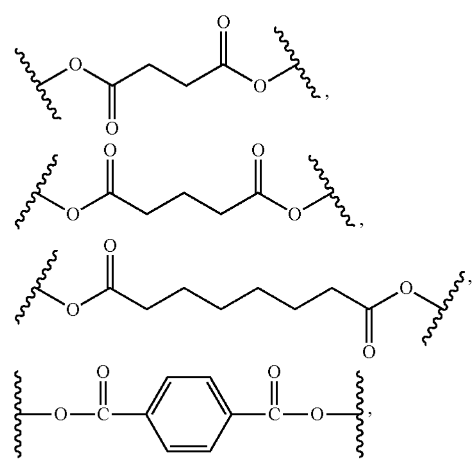

-continued

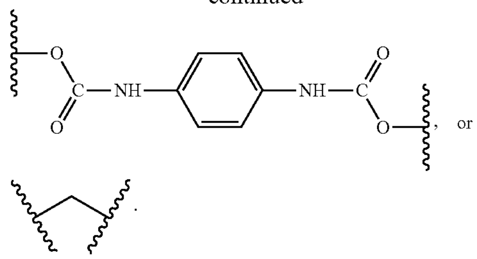

10. The electrode of claim 1, wherein the particles comprise particles of at least one of silicon, germanium, tin, aluminum, alloys thereof, and oxides thereof.

11. The electrode of claim 1, wherein the particles comprise particles of at least one of a carbonaceous material and a conductive polymer.

12. The electrode of claim 11, wherein the carbonaceous material comprises at least one of graphite, synthetic graphite, hard carbon, activated carbon, mesophase carbon, carbon blacks, pyrolytic carbon, glassy carbon, coal, coke, diamond, and fullerenes.

13. The electrode of claim 1, wherein the particles comprise particles of at least one lithium salt.

14. The electrode of claim 1, wherein the electrode comprises from about 60 percent by weight to about 95 percent by weight of the polyphosphazene cyclomatrix.

15. The electrode of claim 1, wherein the electrode comprises from about 5 percent by weight to about 40 percent by weight of the particles.

16. The electrode of claim 1, wherein the electrode comprises from about 0 percent by weight to about 30 percent by weight of silicon particles, and from about 0 percent by weight to about 30 percent by weight of carbonaceous material particles.

17. The electrode of claim 1, further comprising at least one additional polyphosphazene cyclomatrix having at least one different property than the polyphosphazene cyclomatrix.

18. A method of forming an electrode, comprising:

forming an electrode composition comprising particles, at least one crosslinking agent, and a plurality of cyclic phosphazene compounds, each of the plurality of cyclic phosphazene compounds comprising:
a plurality of phosphorus-nitrogen units; and
at least one pendant group bonded to each phosphorus atom of the plurality of phosphorus-nitrogen units; and applying the electrode composition on at least one surface of a current collector; and treating the electrode composition to form a polyphosphazene cyclomatrix configured and formulated for ion intercalation, the polyphosphazene cyclomatrix comprising:
the plurality of cyclic phosphazene compounds;
a plurality of cross-linkages, each cross-linkage of the plurality of cross-linkages bonding one cyclic phosphazene compound of the plurality of cyclic phosphazene compounds with another cyclic phosphazene compound of the plurality of cyclic phosphazene compounds; and
the particles within pores of the polyphosphazene cyclomatrix.

19. The method of claim 18, wherein treating the electrode composition comprises applying at least one of heat and pressure to the electrode composition on the at least one surface of the current collector.

20. The method of claim 18, further comprising formulating the electrode composition to comprise at least one solvent.

21. The method of claim 20, wherein applying the electrode composition on at least one surface of a current collector comprises spraying the electrode composition on the at least one surface of the current collector.

22. The method of claim 21, wherein treating the electrode composition comprises evaporating the at least one solvent from the electrode composition on the at least one surface of the current collector.

23. The method of claim 18, wherein treating the electrode composition comprises exposing the electrode composition on the at least one surface of the current collector to at least one of heat and radiation.

24. An electrochemical cell, comprising:

a negative electrode comprising:
a polyphosphazene cyclomatrix configured and formulated for ion intercalation, the polyphosphazene cyclomatrix comprising:
a plurality of cyclic phosphazene compounds, each cyclic phosphazene compound of the plurality of cyclic phosphazene compounds comprising:
a plurality of phosphorus-nitrogen units; and
at least one pendant group bonded to each phosphorus atom of the plurality of phosphorus-nitrogen units; and
a plurality of cross-linkages, each cross-linkage of the plurality of cross-linkages bonding one phosphazene compound of the plurality of cyclic phosphazene compounds with another cyclic phosphazene compound of the plurality of cyclic phosphazene compounds; and
particles within pores of the polyphosphazene cyclomatrix;

a positive electrode; and a separator comprising at least one electrolyte between the negative electrode and the positive electrode.

25. The electrochemical cell of claim 24, wherein the electrochemical cell has an average operating cell voltage of greater than or equal to about 3.5 V.

26. The electrochemical cell of claim 24, wherein the electrochemical cell has a specific gravimetric capacity of greater than or equal to about 200 Ah $kg^{-1}$.

27. The electrochemical cell of claim 24, wherein the at least one electrolyte comprises at least one lithium salt.

28. The electrochemical cell of claim 24, wherein the negative electrode further comprises at least one additional polyphosphazene cyclomatrix having at least one different property than the polyphosphazene cyclomatrix.

* * * * *